ELECTRON DIFFRACTION PATTERNS FOR $\alpha$-$Fe_2O_3$,
MIXED Co FERRITE, AND MIXED Co FERRITE
COUPLED BY EXCHANGE ANISOTROPY TO $\alpha$-$Fe_2O_3$ $\alpha$-$Fe_2O_3$ MIXED Co FERRITE $\alpha$-$Fe_2O_3$-MIXED Co FERRITE INVENTORS
ROBERT H. LINDQUIST
BERNARD F. MULASKEY
BY Roy H. Davies
ATTORNEY

MICROGEL MIXED COBALT FERRITE PARTICLES

MICROGEL YTTRIUM IRON GARNET COLLOID MILLED WITH ALUMINA

5 MIN., 500X

5 MIN., 1100X

30 MIN., 500X

30 MIN., 1100X

MICROGEL YTTRIUM IRON GARNET COLLOID
MILLED WITH ALUMINA FOR 5 MIN.
APPROXIMATELY 5000X

INVENTORS
ROBERT H. LINDQUIST
BERNARD F. MULASKEY
BY Roy H. Davies
ATTORNEY

MICROGEL YTTRIUM IRON GARNET
$Y_3Fe_5O_{12}$
PHOTOMICROGRAPH OF POLISHED SURFACE

1130X

SWITCHING TIME MEASUREMENT
MICROGEL YTTRIUM IRON GARNET
20 OERSTEDS DRIVE FIELD
30 NANOSECOND SWITCHES RISE TIME

TIME IN UNITS OF 20 NANOSECONDS
PER CM

United States Patent Office 3,425,666
Patented Feb. 4, 1969

3,425,666
PROCESS FOR PRODUCING FERRIMAGNETIC
MATERIALS
Robert H. Lindquist and Bernard F. Mulaskey, Berkeley,
Calif., assignors to Chevron Research, Company, a
corporation of Delaware
Filed Feb. 21, 1963, Ser. No. 260,964
U.S. Cl. 252—62.58                          45 Claims
Int. Cl. C04b 35/26

INTRODUCTION

This application relates generally to a process for producing materials that are magnetizable in a magnetic field and that retain at least a portion of their induced magnetism upon removal of the field.

More particularly, this application relates generally to a process for producing finely divided magnetic particles, i.e., to particulate materials that an applied magnetic field can induce to change from a nonmagnetized condition, in the sense of exhibiting no external fields, into a magnetized condition, in the sense of exhibiting external fields, and that, after removal of the applied magnetic field, remain at least partially magnetized in the sense of continuing to exhibit external fields. Still more particularly, this application relates to a process for producing ferrimagnetic materials, including ferrimagnetic ferrospinels (inverse ferrospinels), ferrimagnetic garnets, ferrimagnetic hexagonal iron oxides, and ferrimagnetic perovskites.

*Ferrimagnetic materials that can be produced by the process of the present invention*

A. Ferrimagnetic ferrospinels (inverse ferrospinels)

(1) *Pure magnetic ferrites.*—$M^{2+}Fe_2^{3+}O_4$, where M is a metal other than cadmium or zinc, and the superscripts indicate the valence state of the metal.

Examples—$MgFe_2O_4$ magnesium ferrite, $CoFe_2O_4$ cobalt ferrite, $FeFe_2O_4$ ferrous ferrite.

(2) *Mixed magnetic ferrites.*—$M_{Ax}^{2+}M_{B1-x}^{2+}Fe_2^{3+}O_4$, where MA is a first metal, and MB is a different metal.

Examples—$Mg_x^{2+}Mn_{1-x}^{2+}Fe_2^{3+}O_4$, $$Co_x^{2+}Mn_{1-x}^{2+}Fe_2^{3+}O_4$$

where $X>0$ and $1>X$.

(3) *Substitution magnetic ferrites.*—

$$M_A^{2+}M_{Bx}^{3+}Fe_{2-x}^{3+}O_4$$

Examples—$Mg^{2+}Al_x^{3+}Fe_{2-x}^{3+}O_4$, $$Mg^{2+}Cr_x^{3+}Fe_{2-x}^{3+}O_4$$

where $X>0$ and $2>X$.

(4) *Mixed substitution ferrites.*—

$$M_{Ax}^{+2}M_{B1-X}M_{Cy}^{3+}M_{D2-Y}O_4$$

Example—$Ni_x^{2+}Co_{1-x}^{2+}Al_y^{3+}Fe_{-y}^{3+}O_4$, where $$X>0 \text{ and } 1>X, Y>0 \text{ and } 2>Y$$

(5) *Lithium "ferrite".*—$Li_2O(Fe_2O_3)_5$, or $LiFe_5O_8$.

B. Ferrimagnetic garnets (1) *Pure magnetic (ferrimagnetic) garnets.*—The general formula for the magnetic garnets is $M_3Fe_2(FeO_4)_3$, where M may be nonmagnetic trivalent yttrium, or lutetium, or one of the magnetic rare-earth ions from lanthanum (element 57) through ytterbium (element 70). If the M ions are nonmagnetic yttrium or lutetium, the magnetic properties of the material are of a very desirable ferrimagnetic type, particularly in that they have no *compensation point* at which magnetism reverses with increasing temperature. Accordingly, yttrium iron garnet (YIG) and lutetium iron garnet (LIG) are useful in many magnetic applications. If the M ions are magnetic rare-earth ions other than europium and samarium, the garnet materials exhibit a compensation point, and magnetization reverses with increasing temperature; although the materials are ferrimagnetic, they have a temperature instability. It will be seen that, unlike the pure magnetic ferrites, the pure, or unsubstituted, magnetic garnet contains all trivalent ions, and therefore is an extremely *high electrical resistivity* material without the possibility of valence interaction. It will also be seen that of the twenty ions in the formula unit of the pure magnetic garnet only five are magnetic (iron) ions, compared with three magnetic ions out of the seven ions in the formula unit of a pure magnetic ferrite.

(2) *Substitution garnets.*—The yttrium iron garnet, for example, can be modified by replacing some of the nonmagnetic yttrium by minor amounts of magnetic impurities such as gadolinium or dysprosium; the magnetic properties of the garnet can be widely varied by such substitutions, and the resulting substituted garnets have practical value in microwave and other applications.

C. Magnetoplumbite structures

The best-known member of the magnetoplumbite class is $BaFe_{12}^{3+}O_{19}$. Another group of ferrimagnetic hexagonal materials that are similar are materials that are formed from $BaFe_{12}O_{19}$ or a similar material, and a ferrimagnetic ferrospinel. Examples of these materials are $BaFe_2^{2+}Fe_{16}^{3+}O_{27}$, $Ba_2Ni_2Fe_{12}O_{22}$, $Ba_3Zn_2Fe_{24}O_{41}$. These compounds have one easy *plane* of magnetization, and high electrical resistivity compared with $BaFe_{12}^{3+}O_{19}$, which has one easy *axis* of magnetization, and high electrical resistivity.

D. Perovskite structures

Ferrimagnetic materials having these structures include $La^{3+}Mn^{3+}O_3 \cdot Me^{2+}Mn^{4+}O_3$, where $Me^{2+}$ is calcium, strontinum, lead, cadmium, or barium. Perovskites also have been made by substituting trivalent yttrium, gadolinium or lanthanum for trivalent iron in nickel ferrite. Of the ferrimagnetic materials, perovskites alone have low electrical resistivity and a very low Curie point.

PRIOR ART PROCESSES FOR PRODUCING FERRIMAGNETIC MATERIALS, DEFICIENCIES THEREOF, AND DEFICIENCIES OF FERRIMAGNETIC MATERIALS SO PRODUCED

A. General

Prior art ferrimagnetic material preparation conventionally involves preparation of polycrystalline magnetic materials in two main steps: (a) preparation of a mixture, as uniform as possible, of the nonferrimagnetic starting materials, and (b) conversion of said starting materials at an elevated temperature to produce the desired ferrimagnetic material by solid state reaction. An example is the solid state reaction of NiO with $Fe_2O_3$ at an elevated temperature to produce the nickel ferrite, $NiFe_2O_3$. In such a solid state reaction the starting materials generally are prepared in powdered form, placed together and heated. The heating causes a mutual diffision of constituents of each starting material to occur to cause growth at the surface of the two materials of a crystallite of the desired ferrimagnetic ferrospinel. When the resulting material is needed commercially in solid form, or, as is usually the case, the crystals are too big or not sufficiently uniform, the material is powdered again. Thereafter, if a solid shape is desired, the powder is formed into the desired shape and sintered.

B. Prior art preparation of a mixture of the nonferrimagnetic starting materials Generally the *oxide method* is used, wherein the starting materials in oxide form are mixed together in the desired proportions by dry or wet ball milling. This is a process that takes hours to days. After the milling the material is heated to 500° to 800° C., and the resulting material is rebroken and milled again. This process may be further repeated to obtain additional homogeneity. Another very similar method is the *decomposition method*, wherein the starting materials are mixed, by milling, in salt form instead of oxide form, and then the salts are converted to the oxides by thermal decomposition in air. Another method is the *precipitation method*, which has been used in an attempt to avoid the lengthy milling process of the oxide and decomposition methods. The *objective* is to simultaneously *precipitate* from a solution the required materials, in either hydroxdie form or oxalate form, so that the precipitate contains the required metal hydroxides or metal oxalates in the correct proportions, already intimately mixed. For example, the starting materials for magnesium ferrite may be precipitated in hydroxide form as follows:

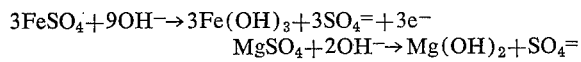

$$MgSO_4 + 2OH^- \rightarrow Mg(OH)_2 + SO_4^=$$

The aforesaid oxide, decompostion, and precipitation methods involve substantial disadvantages. In the oxide and decomposition methods the lengthy ball milling that is required is a disadvantage that the art has long recognized. Even with extended ball milling there is room for much improvement in the homogeneity of the resulting mixture. The lack of homogeneity causes further undesirable results, for example it contributes to lack of uniformity in the ferrimagnetic crystals formed upon subsequent heating of the mixture. The precipitation methods *directionally* improve mixture homogeneity, but entail other disadvantages. For example when a strong base such as sodium hydroxide is used to cause precipitation, the anion, for example sodium, must be removed from the resulting mixture to purify it, and this can present a difficult purification problem.

C. Prior art heating of the starting material mixture to produce a ferrimagnetic material by solid state reaction The solid state reaction of prior art mixtures of nonferrimagnetic oxides to produce a ferrimagnetic material is an extremely slow reaction, and is accomplished at such temperatures as 1300°–1450° C. The prior art method has many disadvantages, mainly associated with the compostion and form of the starting material mixture. The 1300–1450° C. temperature must be maintained for several hours, and slight variations in time, temperature and partial pressure of oxygen cause large and disproportionate effects on the properties of the final material. If the metals are not in their correct valence states in the starting material mixture, and the resulting ferrimagnetic material is formed into a solid shape and sintered, oxidation reactions will occur in the solid shape and cause cracks and imperfections therein. The metal cation constituents of the final ferrimagnetic material must migrate relatively large distances, on the order of a micron or more, through the structure of the oxygen anions, and there is a necessarily incomplete conversion of the starting material mixture to a ferrimagnetic material. The ferrimagnetic crystals are not uniform and because of the high temperatures that are necessary the crystals are large; accordingly the material must be ball milled again to reduce the crystal size to a desirable size.

OBJECTS OF PRESENT INVENTION

In view of the foregoing, the various objects of the present invention include the following:

(1) To provide a process for making ferrimagnetic materials in which the metal cation components are not required to migrate relatively large distances through an oxygen structure to reach their proper sites.

(2) To provide a process for making ferrimagnetic materials in which extensive ball milling and mixing is not necessary to obtain homogeneity.

(3) To provide a process for making ferrimagnetic materials in which no prior art basic precipitants, such as sodium hydroxide, are required.

(4) To provide a process for making ferrimagnetic materials which results in a microporous ferrimagnetic structure susceptible to powdering with a smaller energy requirement than prior art ferrimagnetic materials.

(5) To provide a process for making ferrimagnetic materials in particulate form, each ferrimagnetic material particle being surrounded by, and coupled by exchange anisotropy to, an antiferromagnetic coating.

(6) To provide a process for making ferrimagnetic particles each surrounded by a metal oxide insulating material.

(7) To provide a process for making ferrimagnetifc particles each comprising a ferrimagnetic nucleus surrounded by and coupled by exchange anisotropy to an antiferromagnetic coating, said particles having a coercive force above 500 oersteds after saturation.

(8) To provide a process for making ferrimagnetic particles each surrounded by a metal oxide insulating material.

(9) To provide a process for making ferrimagnetic particles a larger volume percent of which will act as single domain particles than prior art ferrimagnetic particles, when reduced to the same particle size.

(10) To provide a process for making microporous ferrimagnetic particles that will act as single domain particles when in larger particle size than prior art single domain particles.

DRAWINGS

The present invention will be better understood, and additional objects thereof will become apparent, from the following description of the invention, when read in connection with the accompanying drawings, in which.

THE PRESENT INVENTION

A. Statement of invention, general

Figure 1:
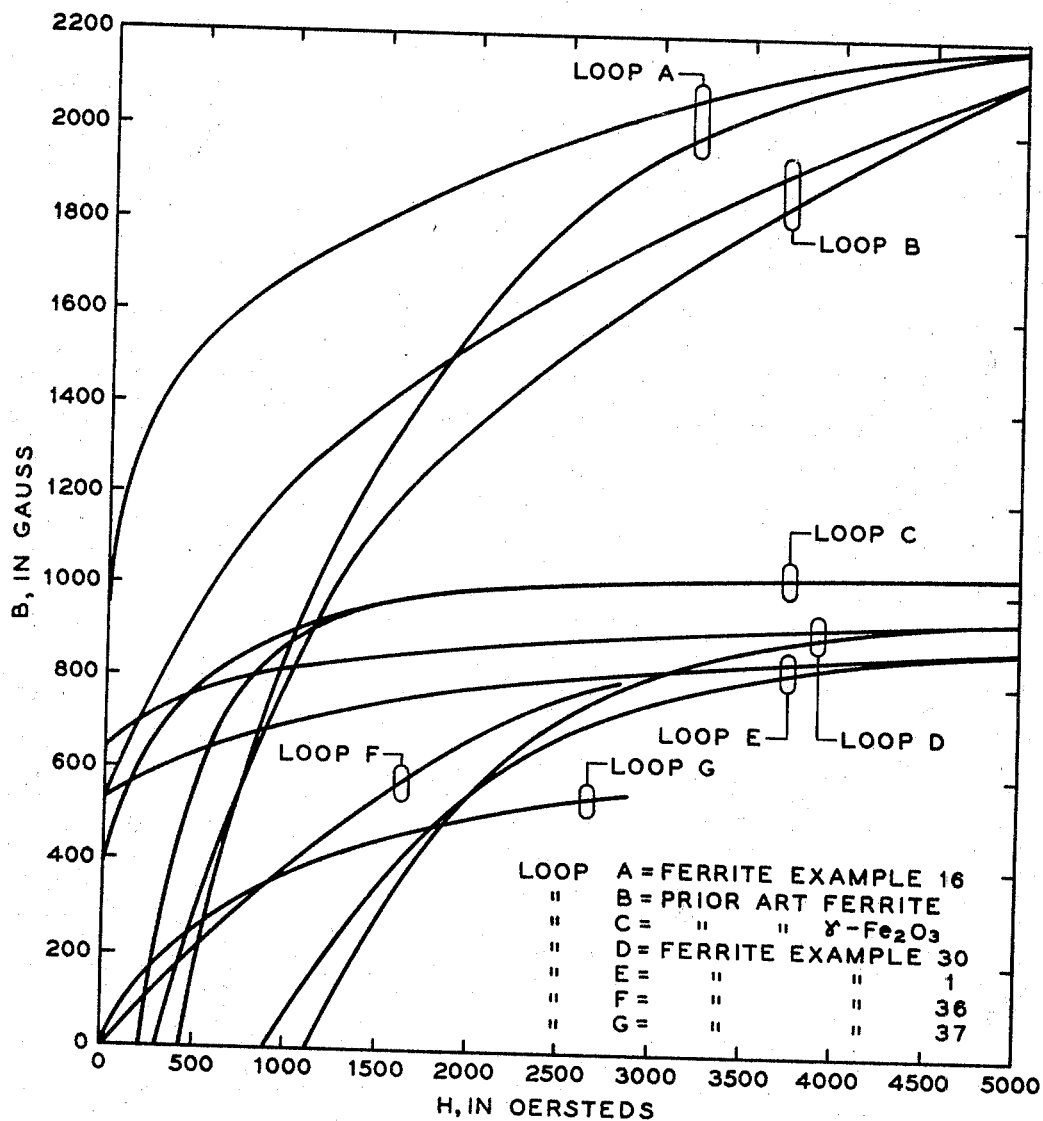
FIG. 1 is a graph showing comparisons of portions of hysteresis loops of particular ferrimagnetic materials prepared according to the process of the present invention with hysteresis loops of various prior art magnetic materials.

In accordance with one embodiment of the present invention, microporous and homogeneous ferrimagnetic materials are prepared by a wet process, which can be called the Microgel process, which includes formation of a substantially homogeneous solution of the constituents of the final product, usually followed by subsequent gelation, without a precipitation step, in contrast to the prior art *oxide* and *decomposition* dry processes and the prior art *precipitation* wet process. The resulting immediate *homogeneity* of the product eliminates the need for extensive ball milling and mixing to obtain homogeneity, and only enough ball milling is needed to reduce the ferrimagnetic particles to a desirable size. The *microporosity* of the product provides myriads of natural fracture lines, enabling the product to be much more easily powdered into fine particles than prior art materials. The resulting powdered material contains a smaller ratio of superparamagnetic particles to particles that behave magnetically as single domain particles than does a corresponding powdered material made by prior art methods. In accordance with this embodiment, a salt of a first metal, in the divalent state when a ferrite is being prepared, and a salt of a second metal in the trivalent state, at least one of said metals preferably being iron, are converted to a mixture of the corresponding hydroxides in the presence of an epoxy compound, and said mixture is converted to the desired microporous ferrimagnetic material by heating. Said conversion, because of the homogeneous nature of said mixture, can be readily accomplished at a much lower temperature than is needed in various prior art methods for converting starting material mixtures to ferrimagnetic materials.

In accordance with another embodiment of the present invention there is provided a process for making a ferrimagnetic material comprising particles of a ferrimagnetic material each substantially surrounded by an anti-ferromagnetic material, said two materials being coupled by exchange anisotropy.

In accordance with a further embodiment of the present invention there is provided a process for manufacturing ferrimagnetic particles each surrounded by a high resistivity non-magnetic metal oxide insulator, for example alumina, which comprises forming a ferrimagnetic material precursor comprising a uniform metal hydroxide gel which upon drying and heating to a temperature above 600° C. would be changed in structure to a ferrimagnetic material structure, passing said gel together with a halide of the metal of the desired insulator, for example aluminum chloride, and a lower alkanol through a colloid mill to form a uniform suspension of fine particles of said gel, adding a lower alkylene oxide to said suspension to form a uniform dispersion of said gel particles in a gel of the desired insulator, for example a hydrous gel of $Al_2O_3$, and heating said uniform dispersion to a temperature above 600° C. to convert the structure of said gel particles to the desired ferrimagnetic material structure, and to convert said insulator gel, to a solid form of the desired insulator, for example solid $\alpha$-$Al_2O_3$, whereby ferrimagnetic particles individually isolated in the desired insulator are produced.

B. Details of the process, and materials produced by the process, of the present invention (1) *General*.—The microgel process of the present invention comprises converting a salt of a first metal, generally in the divalent state, and a salt of a second metal in the trivalent state, at least one of said metals preferably being iron, to a mixture of the corresponding hydroxides in the presence of an epoxy compound and a source of hydroxyl groups, for example water, said salts comprising halogens having atomic numbers greater than 9, and heating said mixture for a sufficient time to produce a ferrimagnetic material.

The epoxy compound may be any epoxy compound that will react at a reasonable rate with the anion of the metal salt, preferably a lower alkylene oxide or an epichlorohydrin. Said lower alkylene oxide may be, for example, ethylene oxide, propylene oxide or butylene oxide.

The metal salt preferably is a metal halide comprising a halogen having an atomic number greater than 9, i.e., a metal chloride, iodide or bromide. The chlorides and iodides are especially preferred. Salts other than halides, for example nitrates, having anions that will combine with the epoxy compound, may be used.

Desirably a solvent, such as a lower alcohol, should be present.

The following is an example of the reaction that takes place in the microgel process:

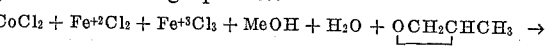

where $CoFe_2(OH)_8$ is a sol that has the desired homogeneous atomic structure, i.e., is contains a uniform dispersion of each of the various ions, and where A includes all of the remaining reaction products. The $CoFe_2(OH)_8$ sol will slowly form into a gel if permitted to do so, and this is is a preferred method of practicing the invention. The remaining reaction products A mainly comprise chlorohydrins such as propylene chlorohydrin, and readily vaporize to leave the desired sol or gel in an adequately pure state.

In the above exemplary reaction, assuming that water is the source of the hydroxyl groups, a hydrogen atom from the water molecule attaches to the oxygen atom of the epoxy compound, leaving one of the epoxy compound carbon atoms with an unsatisfied bond. A halogen atom from one of the metal halides attaches to this bond, leaving the metal with an unsatisfied bond. The latter bond is satisfied with the hydroxyl group remaining from the water molecule.

Because it is important to have a homogeneous solution of all of the necessary components of the final product, it is very desirable to have a solvent present that: (a) will keep the metal salts in solution; (b) will keep the epoxy compound in solution; and (c) will not irreversibly react with the precursors of the final product, or with the final product itself, to incorporate undesired constituents into the final product. Such a solvent should be one that is more polar than the epoxy compound, for example an organic solvent such as a lower alcohol, or water. If a sufficient amount of water is present it will act as the necessary solvent in addition to supplying the hydroxyl groups for the desired product. If only water is relied upon as the solvent, it will be very desirable to use ethylene oxide as the epoxy compound rather than a higher alkylene oxide such as propylene oxide, because the solubility of ethylene oxide is higher in water than is the solubility of a higher alkylene oxide, and the higher solubility increases the probability that the desired epoxy compound concentration in the starting solution can be obtained. However, the presence of an organic solvent in addition to the presence of water is most preferred. Such a solvent may be any organic solvent meeting the aforesaid criteria, for example a lower alkanol, for example methanol, ethanol or propanol, or dimethyl formamide. Methyl alcohol is most preferred because it is very polar, as is water.

The metal halides used may be halides of any metals that are desired in the final ferrimagnetic product, so long as a halide of at least one metal, generally in the divalent state, is present, and a halide of at least one other metal, in the trivalent state, is present. For example, halides of $FE^{+2}$, $Co^{+2}$, $Mg^{+2}$, $Ni^{+2}$, $Mn^{+2}$, $Cu^{+2}$ $Ba^{+2}$, $Fe^{+3}$, $Al^{+3}$, $Cr^{+3}$, $Ti^{+3}$, $Ga^{+3}$, $In^{+3}$, $Gd^{+3}$, $Sc^{+3}$, and $Y^{+3}$ may be used. Preferably a halide of iron will be present, more preferably $Fe^{+3}Cl_3$. The proportions of all of the starting materials can be varied over relatively wide ranges, so long as a homogeneous solution can be obtained. From the present disclosure, including the examples, those skilled in the art will have an adequate guide as to the proportions of ingredients and specific preparation methods that will result in a high degree of homogeneity of the starting mixtures and final ferrimagnetic products. Generally, the constituents of the final ferrimagnetic product may be present in approximately stoichiometric proportions in the starting materials; however, it may be desired to have present an excess of divalent or trivalent iron, particularly when it is desired that the final product have especially high coercivity.

The amounts of each of the starting halides may be varied by substituting for it a halide of a different metal having the same valence, to give various weight percentages of each metal cation in the final ferrimagnetic product.

In the preferred manner of practicing the invention, the sol precursor of the final ferrimagnetic material will form into a gel in a period of a few seconds, to a few hours, depending upon the concentration of the various components and the temperature. The resulting gel, after drying to drive off vaporizable materials not forming a part of the gel, is nonferrimagnetic but becomes ferrimagnetic after a subsequent heating step.

To convert the non-ferrimagnetic sol or gel to a ferrimagnetic material, it is heated to a temperature above 600° C., preferably above 800° C., more preferably between 1100° C. and 1600° C., to cause the metal cations to migrate between the oxygen anions to the proper sites, e.g. the tetrahedral or octahedral sites of a spinel oxygen structure, as previously discussed. The heating time may be varied from two or three minutes to many hours. However, the higher the temperature the less time will be required for complete cation migration, and after migration is complete continued heating is generally of little use. At 1300° C. a heating time of 3 to 5 hours is desirable. Heating may be terminated prior to complete cation migration, and therefore magnetic properties, particularly coercive force, may be varied by varying the duration of heating.

The resulting ferrimagnetic material is microporous, in that it contains myriads of micropores, i.e., pores below 0.1 micron (1000 A.) in diameter as well as larger pores. Although the larger pores are present, they have a much lower surface area per volume of pore, and so contribute little to the surface area of the material, compared with the contribution to surface area made by the micropores. This extremely high surface area, microporous material accordingly is much more frangible than corresponding prior art materials; because the micropores constitute natural fracture lines the material can be physically broken down into single domain particles much more readily than can corresponding prior art materials, which often must be ball milled for days before the particle diameters approach a micron or less.

Not only can the particles readily be broken down in size, but it is not necessary to break them down in size as far as in the case with prior art particles in order to obtain particles having single domain magnetic behavior. This is because as a particle is broken down in size it is still microporous, and the micropores impede domain wall movement; accordingly, when the particles of the present invention are reduced to a certain size they will behave magnetically as single domain particles even though more than one domain is present. Further, particle grinding of a batch of ferrimagnetic powder prepared according to the process of the present invention will result in a smaller ratio of superparamagnetic particles, that retain no magnetization after removal of an applied field, to particles that behave as single domain particles, than will particle grinding of prior art ferrimagnetic powders. i.e., in both prior art methods and the present method milling results in the production of superparamagnetic particles, larger single domain particles that are not paramagnetic, and multidomain particles. Because some of the latter behave as single domain particles in the present method, the total amount of particles that behave as single domain particles that are produced for a given production of superparamagnetic particles is larger in the present process than in prior art processes. For most applications it is desirable to break down the particles of a mass of ferrimagnetic material prepared according to the process of the present invention to an average particle size below about one micron.

The ease with which finely powdered ferrimagnetic materials can be prepared pursuant to the present invention contributes greatly to ease of fabrication of shapes from the powdered materials. The fine powder can be pressed into shapes having dimensions close to the final desired dimensions; accordingly little finish grinding of the fired shapes is necessary.

(2) *Exchange anisotropy coupling between nuclei of ferrimagnetic particles and antiferromagnetic coating surrounding said nuclei.*—The term "exchange anisotropy" was coined to describe a magnetic interaction between an antiferromagnetic material and a ferromagnetic material. The term has been extended to also cover interaction between antiferromagnetic and ferrimagnetic phases, and also between ferrimagnetic and ferromagnetic phases. In each case, the spin systems of the two phases are coupled.

In one embodiment of the process of the present invention particles of a ferrimagnetic material are produced that are substantially surrounded by a coating of an antiferromagnetic material, and the spin systems of the two phases are coupled by exchange anisotropy to provide a resulting coated ferrimagnetic material in particulate form having a materially higher coercive force than said ferrimagnetic material would have alone, or that said ferrimagnetic and antiferromagnetic material would have together if not coupled by exchange anisotropy. In its preferred form, this embodiment comprises producing particles of a ferrimagnetic material, especially a ferrimagnetic ferrospinel, substantially surrounded by, and coupled by exchange anisotropy to, $\alpha$-$Fe_2O_3$. Whereas it is most difficult by conventional methods to prepare a ferrimagnetic ferrospinel having a coercive force above 1000 oersteds, after an applied field of 4600 oersteds, this is easily accomplished pursuant to the present invention by coupling to the ferrimagnetic ferrospinel by exchange anisotropy an antiferromagnetic material.

The proportion of the antiferromagnetic material, for example $\alpha$-$Fe_2O_3$, present in the final high coercive force material is dependent upon the proportion of the halides of the divalent precursor materials, for example $FeCl_2$ or $CoCl_2$, present in the starting materials, and also upon the temperature at which the mixture of starting materials is heated to convert it to a ferrimagnetic material, and to a limited extent upon the duration of the heating. The proportion of the antiferromagnetic material present in the final product can be varied from about 5 to 95 weight percent. It is increased in this range by increasing the concentration of the divalent starting halide precursor of the antiferromagnetic material, or by increasing the temperature of heating of the gel, or both. Those skilled in the art, by routine experimentation from the teachings herein, will be able to determine how these factors should be varied to vary the results in accordance with their requirements. If more than about 30 volume percent of the antiferromagnetic material is present in the final product, it substantially completely surrounds all of the ferrimagnetic particles.

It is known that an exchange anisotropy coupling in a material results in a hysteresis loop that is displaced along the H axis when a hysteresis loop is obtained after cooling a specimen of the material in a field to a temperature below a magnetic transition temperature, as discussed in connection with FIG. 7, herein.

Where the ferrimagnetic material comprises iron oxide, it may be coupled by exchange anisotropy to $\alpha$-iron oxide, as indicate dabove. Similarly, an antiferromagnetic material other than $\alpha$-iron oxide, for example $\alpha$-$Cr_2O_3$, may be coupled by exchange anisotropy to a ferrimagnetic material when the two materials have similar lattice spacing. The similar lattice spacing provides the necessary close lattice coupling that is necessary for exchange anisotropy.

It is also known that the existence of exchange anisotropy coupling between ferrimagnetic and antiferromagnetic phases results in a hysteresis loop shift, and that the occurrence of this transition is proof of the existence of such coupling. The existence of this type of coupling, for example the coupling of $\alpha$-$Fe_2O_3$ to a ferrimagnetic material, can be proven by making use of a magnetic transition for $\alpha$-$Fe_2O_3$ called the "Morin transition" that occurs at $-20°$ C. The antiferromagnetic electron spins of $\alpha$-$Fe_2O_3$ order in the transverse plane to their direction above $-20°$ C. when cooled through the Morin transition temperature. Thus by cooling a magnetically saturated system of $\alpha$-$Fe_2O_3$ and ferrimagnetic material coupled by exchange anisotropy through the Morin transition a preferred direction of magnetic coupling is "locked in" and a displaced hysteresis loop will result. This transition has been noted experimentally in materials prepared in accordance with this embodiment of the present invention.

(3) *Insulation of ferrimagnetic particles with a high resistivity metal oxide in accordance with the present invention.*—In the embodiment of the present invention discussed in A, above, wherein ferrimagnetic material particles each surrounded by $\alpha$-$Al_2O_3$ insulator are produced, the ferrimagnetic material precursor gel together with aluminum chloride and a lower alkanol are passed through a colloid mill to form a uniform suspension of fine particles of said gel. A lower alkylene oxide, for example propylene oxide, is added to said suspension, to form a uniform dispersion of said particles in an $Al_2O_3$ gel, in the form of $Al(OH)_3$ which, upon heating, is converted to$Al_2O_3$ as follows:

$$2[Al(OH)_3] \rightarrow 3H_2O + Al_2O_3$$

Upon heating to a temperature above about 600° C., preferably from 800° C. to 1300° C., the structure of said gel particles is converted to a ferrimagnetic material structure, and said $Al_2O_3$ is converted to $\alpha$-$Al_2O_3$, the resulting material being a microporous mass easily broken down into ferrimagnetic particles each having single domain particle magnetic behavior and each being individually isolated in an $\alpha$-$Al_2O_3$ coating. Any other desired nonmagnetic, high resistivity metal oxide, for example silica, zirconia or magnesia, may be used as a coating instead of alumina, by employing a halide of the desired metal instead of a halide of aluminum. The preferred halides for the aforesaid reaction are the chlorides, iodides and bromides, i.e., those halides comprising halogens having atomic numbers greater than 9, therefore excluding fluorides. The chlorides and iodides are especially preferred. For a silica or silica-containing coating, tetraethyl orthosilicate or a homolog thereof is preferred.

In accordance with this embodiment of the present invention ferrimagnetic particles may be produced each of which is surrounded by, and coupled by exchange anisotropy to, an antiferromagnetic material, with the resulting composite being further encased in a shell of the desired insulating material.

(4) *Examples of the process and materials of the present invention*

(a) General

In all of the following groups of examples, the microgel process was used to prepare ferrimagnetic materials. The gel produced in each example was dried in a drying oven to dryness at 300° F. The resulting dried product was then treated in three steps: (a) heating at 800° C. in an air atmosphere for 4 hours to convert the dried gel to a form which could be readily powdered; in this step the hydroxides were converted to mixed oxides and the material was ground to a powder; although this step was not necessary it facilitated the production of a denser powder so that more material could be treated in a particular furnace in the subsequent heating step; (b) powdering of the resulting material in a conventional manner; (c) firing at the indicated temperature, for example 1200° C. or 1300° C., for 4 hours in order to convert the powder to a ferrimagnetic material. In each case the type of ferrimagnetic material produced was verified by X-ray diffraction data.

Magnetic and other properties of the materials produced in the following groups of examples are given following each group of examples.

(b) Ferrite examples

EXAMPLE 1

A solution of the following composition was prepared:

| | |
|---|---|
| $CoCl_2$, g. | 94.4 |
| $FeCl_2$, g. | 133.6 |
| $FeCl_3$, g. | 428.2 |
| $CH_3OH$, cc. | 1000 |
| $H_2O$, cc. | 250 |

The solution was cooled to 0° C. 200 cc. of propylene oxide were added, the temperature rose and was returned to 0° C., and 200 cc. more of propylene oxide were added. The resulting materials set up into a gel in 12 minutes. A powdered portion of this gel was fired at 1300° C. to convert the powder to a ferrimagnetic material. The hysteresis loop for this material is discussed in connection with FIG. 1, herein.

EXAMPLE 2

A powdered portion of the gel produced in Example 1 was fired at 1200° C. to convert the powder to a ferrimagnetic material.

EXAMPLE 3

A solution of the following composition was prepared:

| | |
|---|---|
| $CoCl_2$, g. | 61.8 |
| $FeCl_2$, g. | 120.1 |
| $FeCl_3$, g. | 466.0 |
| $CH_3OH$, cc. | 1000 |
| $H_2O$, cc. | 250 |

The solution was cooled to 0° C., 200 cc. of propylene oxide were added, the temperature rose and was returned to 0° C., and 200 cc. more of propylene oxide were added. The resulting material set up into a gel in 12 minutes. A powdered portion of this gel was fired at 1300° C. to convert the powder to a ferrimagnetic material.

EXAMPLE 4

A powdered portion of the gel produced in Example 3 was fired at 1200° C. to convert the powder to a ferrimagnetic material.

EXAMPLE 5

A solution of the following composition was prepared:

| | |
|---|---|
| $CoCl_2$, g. | 710 |
| $FeCl_2$, g. | 1466 |
| $FeCl_3$, g. | 4694 |
| $CH_3OH$, litres | 6.6 |
| $H_2O$, litres | 2.5 |
| Propylene oxide, litres | 2.0 |

The solution was allowed to cool to room temperature, then 2 litres more of propylene oxide were added. The resulting material set up into a gel in 2 minutes. A powdered portion of this gel was then fired at 1300° C., and the resulting material was finely ground in two successive passes through a fluid energy pulverizing machine. Electron microscopy and electron diffraction studies of this material are discussed in connection with FIGS. 8, 9, 10 and 11, herein.

EXAMPLE 6

A powdered portion of the material in Example 5 that had been heated at 800° C. was then fired at 1300° C., and the resulting material was finely ground in one pass through a fluid energy pulverizing machine.

EXAMPLE 7

A protion of the material in Example 5 that had been heated at 800° C. was then fired at 1200° C., and the resulting material was then finely ground in one pass through a fluid energy pulverizing machine.

EXAMPLE 8

A solution of the following composition was prepared:

| | |
|---|---|
| $CoCl_2$, g. | 237.95 |
| $FeCl_3$, g. | 224.4 |
| $CH_3OH$, cc. | 2000 |
| $H_2O$, cc. | 500 |

The solution was cooled to 0° C., and 670 cc. propylene oxide were added. The resulting material set up into a gel in 5 minutes. A powdered portion of this gel was fired at 1300° C. to convert the powder to a ferrimagnetic material.

EXAMPLE 9

A powdered portion of the gel produced in Example 8 was fired at 1200° C. to convert the powder to a ferrimagnetic material.

EXAMPLE 10

A powdered portion of the gel produced in Example 8 was fired at 1100° C. to convert the powder to a ferrimagnetic material.

EXAMPLE 11

A solution of the following composition was prepared:

| | |
|---|---|
| $CoCl_2$, g. | 237.95 |
| $FeCl_3$, g. | 324.4 |
| $CH_3OH$, cc. | 2000 |
| $H_2O$, cc. | 500 |

The solution was cooled to 0° C. and 670 cc. propylene oxide were added. The resulting material set up into a gel in 5 minutes. A powdered portion of this gel was fired at 1300° C. to convert the powder to a ferrimagnetic material.

EXAMPLE 12

A powdered portion of the gel produced in Example 11 was fired at 1200° C. to convert the powder to a ferrimagentic material.

EXAMPLE 13

A powdered portion of the gel produced in Example 11 was fired at 1100° C. to convert the powder to a ferrimagnetic material.

EXAMPLE 14

A solution of the following composition was prepared:

| | |
|---|---|
| $CoCl_2$, g. | 178.4 |
| $FeCl_2$, g. | 49.7 |
| $FeCl_3$, g. | 324.4 |
| $CH_3OH$, cc. | 2000 |
| $H_2O$, cc. | 500 |

The solution was cooled to 0° C. and 400 cc. propylene oxide were added. The resulting material set up into a gel in a few minutes. A powdered portion of the gel was fired at 1300° C. to convert the powder to a ferrimagnetic material.

EXAMPLE 15

A powdered portion of the gel produced in Example 14 was fired at 1200° C. to convert the powder to a ferrimagnetic material.

EXAMPLE 16

A powdered portion of the gel produced in Example 14 was fired at 1100° C. to convert the powder to a ferrimagnetic material. The hysteresis loop for this material is discussed in connection with FIG. 1, herein.

EXAMPLE 17

A solution of the following composition was prepared:

| | |
|---|---|
| $FeCl_2$, g. | 324.4 |
| $CH_3OH$, cc. | 1500 |
| $H_2O$, cc. | 250 |

The solution was cooled to 0° C. and 270 cc. propylene oxide were added. The resulting material set up into a gel in 5 minutes. A powdered portion of this gel was fired at 1300° C. to convert the powder to $\alpha$-iron oxide.

EXAMPLE 18

A solution of the following composition was prepared:

| | |
|---|---|
| $AlCl_3$, g. | 482.9 |
| $CH_3OH$, cc. | 1500 |
| $H_2O$, cc. | 250 |

EXAMPLE 19

To one-third the gel in Example 17 was added one-half of the solution in Example 18. The resulting mixture was mixed in a colloid mill for 15 minutes, then 270 cc. propylene oxide were added. The resulting material set up into a gel in 5 minutes. A powdered portion of this material was heated at 1300° C. to convert the powder to a ferrimagnetic material.

EXAMPLE 20

To one-third of the gel in Example 17 was added one-half of the solution in Example 18. The resulting mixture was mixed in a colloid mill for one hour, then 220 cc. propylene oxide were added. The resulting material set up into a gel in 5 minutes. A powdered portion of this material was heated at 1300° C. to convert the powder to a ferrimagnetic material.

EXAMPLE 21

A solution of the following composition was prepared:

| | |
|---|---|
| $CoCl_2$, g. | 94.5 |
| $FeCl_2$, g. | 133.6 |
| $FeCl_3$, g. | 428.2 |
| $CH_3OH$, cc. | 1000 |
| $H_2O$, cc. | 250 |

The solution was cooled to 0° C., 200 c. propylene oxide were added, the temperature was allowed to return to 0° C., and 200 cc. more of propylene oxide were added. The resulting material set up into a gel in 12 minutes. A powdered portion of this material was fired at 1300° C. to convert the powder to a ferrimagnetic material.

EXAMPLE 22

A further powdered portion of the material in Example 21 was fired at 1100° C. to convert the powder to a ferrimagnetic material.

EXAMPLE 23

A solution was prepared in the same proportions as, and in 1⅓ times the volume of, the solution of Example 18.

EXAMPLE 24

One-half the solution of Example 23 was added to one-third of the gel material in Example 21. The mixture was mixed in a colloid mill for 15 minutes, then 270 cc. propylene oxide were added. The resulting material set up into a gel in one hour. A powdered portion of this material was fired at 1300° C. to convert the powder to a ferrimagnetic material.

EXAMPLE 25

A further powdered portion of the material in Example 24 was fired at 1100° C. to convert the powder to a ferrimagnetic material.

EXAMPLE 26

One-half the solution of Example 23 was added to one-third of the gel material in Example 21. The mixture was mixed in a colloid mill for one-half hour, then 220 cc. propylene oxide were added. The resulting material set up into a gel in one hour. A powdered portion of this material was fired at 1200° C. to convert the powder to a ferrimagnetic material.

EXAMPLE 27

A further powdered portion of the gel material in Example 26 was fired at 1100° C. to convert the powder to a ferrimagnetic material.

EXAMPLE 28

A solution of the following composition was prepared:

| | |
|---|---|
| $CoCl_2$, g. | 1071 |
| $FeCl_2$, g. | 1515 |
| $FeCl_3$, g. | 2903 |
| $CH_3OH$, litres | 22 |
| $H_2O$, litres | 4 |

The solution was cooled to 13° C., 2250 cc. propylene oxide were added, the temperature rose to 34° C., 2250 cc. more of propylene oxide were added, and the resulting material set up into a gel in 3 minutes. After drying at 300° C., this material had a pore volume of 0.144 cc. per gram, and a surface area of 16 m.²/g. A powered portion of this gel was heated at 800° C. for 4 hours to convert the powder to a ferrimagnetic material, and then ground to 100 mesh. The resulting material had a pore volume of 0.06 cc. per gram, and a surface area of 3 m.²/g. A further powdered portion of the aforesaid gel was fired for 4 hours at 1300° C. to convert the powder to a ferrimagnetic material having the magnetic properties listed in the table below, and having a pore volume of 0.0313 cc./gram and a surface area of 3 m.²/g. after being ground to 100 mesh. The aforesaid pore volumes and surface areas are typical of the ferrimagnetic materials produced by the process of the present invention; the powdered materials have an average particle size below 1 micron, together with pore volumes above .02 cc. per gram, and surface areas above 2 m.²/gram, in comparison with prior art materials which do not have such large pore volumes and high surface areas.

EXAMPLE 29

A powered portion of the gel material in Example 28 was fired at 1300° C. to convert the powder to a ferrimagnetic material.

EXAMPLE 30

A further powdered portion of the gel material in Example 28 was fired at 1300° C. to convert the powder to a ferrimagnetic material. The hysteresis loop for this material is discussed in connection with FIG. 1, herein.

EXAMPLE 31

A further powdered portion of the ferrimagnetic material in Example 28 was more finely powdered by passage through a fluid energy pulverizing machine.

EXAMPLE 32

Example 31 was repeated with a further powdered tion of the ferrimagnetic material in Example 28. A specimen made from the resulting ferrimagnetic material was cooled in liquid nitrogen and a Morin transition obtained, evidencing the presence of exchange anisotropy coupling between the ferrimagnetic component and the antiferromagnetic component of each particle, as discussed in connection with FIG. 7, herein.

EXAMPLE 33

Example 31 was repeated with a further powdered portion of the ferrimagnetic material in Example 28.

EXAMPLE 34

Example 31 was repeated with a further powdered portion of the ferrimagnetic material in Example 28.

EXAMPLE 35

For purposes of comparison with the material produced in Example 32, a cobalt ferrite was prepared by conventional prior art methods. 15.05 g. $\gamma$-$Fe_2O_3$ and 4.6 g. CoO were ball milled in a conventional ball mill for 84 hours, after which the mixture was fired for 4 hours at 1300° C. X-ray diffraction examination showed that the resulting material was all cobalt ferrite, and therefore contained no $\alpha$-iron oxide. The material was cooled in liquid nitrogen and an attempt was made to obtain a displaced hysteresis loop evidencing the presence of exchange anisotropy coupling, with negative results.

EXAMPLE 36

A solution of the following composition was prepared:

| | |
|---|---|
| $FeCl_3$, g. | 34 |
| $MgCl_2$, g. | 12.5 |
| $MnCl_2$, g. | 37 |
| $Ch_3OH$, cc. | 750 |
| Water of hydration of chlorides. | |
| Propylene oxide, ml. | 500 |

The resulting material set up into a gel,

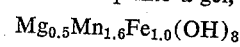

$Mg_{0.5}Mn_{1.6}Fe_{1.0}(OH)_8$ in 30 minutes. A portion of this material, after being heated 4 hours at 800° C., was compressed into a disc shape, then reduced in hydrogen in a magnetic field of 10,000 oersteds at 450° C. for 4 hours.

EXAMPLE 37

A solution of the following composition was prepared:

| | |
|---|---|
| $FeCl_3$, g. | 34 |
| $MgCl_3$, g. | 12.5 |
| $MnCl_2$, g. | 37 |
| $AlCl_3$, g. | 30 |
| $CH_3OH$, cc. | 750 |
| Water of hydration of chlorides. | |
| Propylene oxide, ml. | 500 |

TABLE OF MAGNETIC PROPERTIES OF MATERIALS PRODUCED IN FOREGOING FERRITE EXAMPLES

| Ex. No. | Molecular Proportions of Starting Materials | | | | | $B_R$ | $B_{AF}$ | $H_C$ | $B_R/B_{AF}$ | $\mu_o$ | Firing temp., °C. | Applied Field (AF), Oersteds |
|---|---|---|---|---|---|---|---|---|---|---|---|---|
| | $Co^{+2}$ | $Fe^{+2}$ | $Fe^{+3}$ | O | $Al_2O_3$, Vol. Percent | | | | | | | |
| 1 | 0.5 | 0.95 | 2.0 | 4.0 | | 479 | 870 | 855 | 0.545 | 1.2 | 1,300 | 4,600 |
| 2 | 0.5 | 0.95 | 2.0 | 4.0 | | 310 | 1,107 | 296 | 0.280 | 1.8 | 1,200 | 4,600 |
| 3 | 0.3 | 0.7 | 2.0 | 4.0 | | 273 | 557 | 756 | 0.490 | 1.1 | 1,300 | 4,600 |
| 4 | 0.3 | 0.7 | 2.0 | 4.0 | | 185 | 740 | 279 | 0.250 | 1.1 | 1,200 | 4,600 |
| 5 | 0.15 | 0.85 | 2.0 | 4.0 | | 329 | 623 | 920 | 0.521 | 0.83 | 1,300 | 4,600 |
| 6 | 0.15 | 0.85 | 2.0 | 4.0 | | 382 | 672 | 854 | 0.569 | 0.74 | 1,300 | 4,600 |
| 7 | 0.15 | 0.85 | 2.0 | 4.0 | | 208 | 651 | 296 | 0.320 | 1.5 | 1,200 | 4,600 |
| 8 | 1.0 | 0.0 | 2.0 | 4.0 | | 703 | 2,424 | 122 | 0.290 | 2.1 | 1,300 | 4,600 |
| 9 | 1.0 | 0.0 | 2.0 | 4.0 | | 372 | 1,698 | 43 | 0.219 | 5.7 | 1,200 | 4,600 |
| 10 | 1.0 | 0.0 | 2.0 | 4.0 | | 669 | 2,505 | 122 | 0.267 | 2.0 | 1,100 | 4,600 |
| 11 | 1.0 | 0.0 | 2.0 | 4.0 | | 680 | 2,765 | 99 | 0.246 | 2.4 | 1,300 | 4,600 |
| 12 | 1.0 | 0.0 | 2.0 | 4.0 | | 480 | 2,124 | 99 | 0.226 | 2.7 | 1,200 | 4,600 |
| 13 | 1.0 | 0.0 | 2.0 | 4.0 | | 808 | 2,384 | 148 | 0.339 | 1.96 | 1,100 | 4,600 |
| 14 | 0.75 | 0.25 | 2.0 | 4.0 | | 841 | 2,604 | 230 | 0.323 | 1.4 | 1,300 | 4,600 |
| 15 | 0.75 | 0.25 | 2.0 | 4.0 | | 802 | 2,481 | 263 | 0.323 | 1.2 | 1,200 | 4,600 |
| 16 | 0.75 | 0.25 | 2.0 | 4.0 | | 961 | 2,445 | 427 | 0.393 | 1.3 | 1,100 | 4,600 |
| 17 | 0.0 | 1.0 | 0.0 | 3.0 | | 11 | 19 | 552 | 0.566 | 0.25 | 1,300 | 4,600 |
| 18 | 0.0 | 0.0 | 0.0 | | | | | | | | | |
| 19 | 0.0 | 3.0 | 2.0 | 4.0 | 50.0 | 3 | 9 | 109 | 0.360 | 0.21 | 1,300 | 4,600 |
| 20 | 0.0 | 3.0 | 2.0 | 4.0 | 50.0 | 4 | 16 | 99 | 0.260 | 0.47 | 1,300 | 4,600 |
| 21 | 0.5 | 0.95 | 2.0 | 4.0 | | 578 | 979 | 772 | 0.590 | 1.3 | 1,300 | 4,600 |
| 22 | 0.5 | 0.95 | 2.0 | 4.0 | | 290 | 764 | 427 | 0.379 | 0.67 | 1,100 | 4,600 |
| 23 | 0.0 | 0.0 | 0.0 | | | | | | | | | |
| 24 | 0.5 | 0.95 | 2.0 | 4.0 | 50.0 | 269 | 386 | 158 | 0.698 | 3.4 | 1,300 | 4,600 |
| 25 | 0.5 | 0.95 | 2.0 | 4.0 | 50.0 | 89 | 187 | 362 | 0.476 | 1.7 | 1,100 | 4,600 |
| 26 | 0.5 | 0.95 | 2.0 | 4.0 | 50.0 | 126 | 242 | 240 | 0.519 | 2.0 | 1,200 | 4,600 |
| 27 | 0.5 | 0.95 | 2.0 | 4.0 | 50.0 | 85 | 178 | 329 | 0.475 | 1.3 | 1,100 | 4,600 |
| 28 | 0.5 | 0.95 | 2.0 | 4.0 | | 653 | 932 | 756 | 0.700 | 1.8 | 1,300 | 4,600 |
| 29 | 0.5 | 0.95 | 2.0 | 4.0 | | 667 | 966 | 1,038 | 0.690 | 1.8 | 1,300 | 4,600 |
| 30 | 0.5 | 0.95 | 2.0 | 4.0 | | 651 | 879 | 1,084 | 0.740 | 1.6 | 1,300 | 4,600 |
| 31 | 0.5 | 0.95 | 2.0 | 4.0 | | 875 | 1,326 | 1,512 | 0.66 | 0.59 | 1,300 | 4,600 |
| 32 | 0.5 | 0.95 | 2.0 | 4.0 | | 1,346 | 1,794 | 5,717 | 0.75 | 1.08 | 1,300 | 15,000 |
| 33 | 0.5 | 0.95 | 2.0 | 4.0 | | 1,403 | 2,093 | 2,696 | 0.67 | 1.7 | 1,300 | 15,000 |
| 34 | 0.5 | 0.95 | 2.0 | 4.0 | | 1,446 | 1,944 | 5,771 | 0.74 | | 1,300 | 15,000 |
| 35 | 0.5 | 0.95 | 2.0 | 4.0 | | 449 | 748 | 2,157 | 0.60 | 0.98 | 1,300 | 15,000 |

| Ex. No. | Molecular Proportions of Starting Materials | | | | | $B_R$ | $B_{AF}$ | $H_C$ | $B_R/B_{AF}$ | $\mu_o$ | Firing Temp., °C. | Applied Field (AF), Oersteds |
|---|---|---|---|---|---|---|---|---|---|---|---|---|
| | $Mg^{+2}$ | $Mn^{+2}$ | $Fe^{+3}$ | O | $Al^{+3}$ | | | | | | | |
| 36 | 0.5 | 1.5 | 1.0 | 4.0 | | 15.5 | 946 | <15 | 0.166 | 2.0 | 800 | 3,000 |
| 37 | 0.5 | 1.5 | 1.0 | 4.0 | 1.0 | 10.0 | 492 | 10- | 0.2 | 10.+ | 800 | 3,000 |
| 38 | 0.5 | 1.5 | 1.0 | 4.0 | | 850 | 946 | <15 | 0.9 | 2.0 | 800 | 100 |

The resulting material set up into a gel,

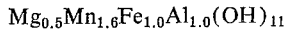

$Mg_{0.5}Mn_{1.6}Fe_{1.0}Al_{1.0}(OH)_{11}$ in 10 minutes. A portion of this material, after being heated 4 hours at 800° C., to produce a substitution ferrite having a stoichiometric excess of aluminum, was compressed into a disc shape, then reduced in hydrogen in a magnetic field of 10,000 oersteds at 450° C. for 4 hours.

EXAMPLE 38

A portion of the gel material of Example 36, after being heated 4 hours at 800° C., is hot pressed into a toroidal shape of a size suitable for a computer memory core.

(c) Garnet examples

EXAMPLE 1

A solution of the following composition was prepared:

$YCl_3$, g. _____ 4.0
$GdCl_3$ g. _____ 8.1
$FeCl_3$, g. _____ 13.8
$FeCl_2$, g. _____ 6.7
$CH_3OH$, ml. _____ 50

The solution was cooled to 0° C., and 34 cc. propylene oxide were added. The resulting material set up to a gel in 5 minutes. A powdered portion of this material was fired at 1300° C. to convert the powder to a ferrimagnetic material.

EXAMPLE 2

A solution of the following composition was prepared:

$GdCl_3$, g. _____ 13.5
$FeCl_3$, g. _____ 13.8
$FeCl_2$, g. _____ 6.7
$CH_3OH$, ml. _____ 50

The solution was cooled to 0° C., and 34 cc. of propylene oxide were added. The resulting material set up into a gel in 5 minutes. A powdered portion of this material was fired at 1200° C. to convert the powder to a ferrimagnetic material.

EXAMPLE 3

A solution of the following composition was prepared:

$YCl_3$, g. _____ 245.9
$FeCl_3$, g. _____ 219.2
$FeCl_2$, g. _____ 107.2
$CH_3OH$, cc. _____ 1480
$H_2O$, cc. _____ 400

The solution was cooled to 0° C., and 178 cc., propylene oxide were added. The resulting material set up to a gel in 15 minutes.

EXAMPLE 4

A solution of the following composition was prepared:

$AlCl_3$, g. _____ 189.4
$CH_3OH$, cc. _____ 267
$H_2O$, cc. _____ 200

EXAMPLE 5

One-half the gel material in Example 3 was added to one-half the solution in Example 4, the mixture was mixed in a colloid mill for 5 minutes, 157.7 cc. propylene oxide were added and milling was continued for 30 seconds. The resulting material was removed from the mill and set up into a gel in 5 minutes. A powdered portion of this material was fired at 1300° C. to convert the powder to a ferrimagnetic material.

EXAMPLE 6

One-half the gel material in Example 3 was added to one-half the solution in Example 4, the mixture was mixed in a colloid mill for 30 minutes, 157.7 cc. propylene oxide were added and milling was continued for 30 seconds. The resulting material was removed from the mill and set up into a gel in 5 minutes. A powdered portion of this material was fired at 1300° C. to convert the powder to a ferrimagnetic material.

EXAMPLE 4

A solution of the following composition was prepared:

AlCl$_3$, g. ---------------------------------- 473.6
CH$_3$OH, cc. --------------------------------- 670
H$_2$O, cc. ----------------------------------- 400

TABLE OF MAGNETIC PROPERTIES OF MATERIALS PRODUCED IN FOREGOING GARNET EXAMPLES

| Garnet Ex. No. | Molecular Proportions of Starting Materials | | | | | Weight of sample in grams | Vol. percent Al$_2$O$_3$ | $B_R$ | $B_{4,600}$ | $B_R/B_{4,600}$ | $H_C$ | $\mu_0$ | Firing Temp., °C. | Applied Field, Oersteds |
|---|---|---|---|---|---|---|---|---|---|---|---|---|---|---|
| | Y$^{+2}$ | Gd$^{+2}$ | Fe$^{+3}$ | Fe$^{+3}$ | O | | | | | | | | | |
| 1 | 1.2 | 1.8 | 2.0 | 3.0 | 12.0 | .124 |  | 74 | 240 | .31 | 11.8 | 16.5 | 1,300 | 4,600 |
| 2 | 0.0 | 3.0 | 2.0 | 3.0 | 12.0 | .09 |  | 5.7 | 11 | .52 | 33.0 | .45 | 1,200 | 4,600 |
| 3 | 3.0 | 0.0 | 2.0 | 3.0 | 12.0 |  |  |  |  |  |  |  |  |  |
| 4 |  |  |  |  |  |  |  |  |  |  |  |  |  |  |
| 5 | 3.0 |  | 2.0 | 3.0 | 12.0 | .167 | 30 | 16.1 | 45 | .35 | 47 | .78 | 1,300 | 4,600 |
| 6 | 3.0 |  | 2.0 | 3.0 | 12.0 |  | 30 |  |  |  |  |  | 1,300 | 4,600 |

(d) Hexagonal iron oxide examples

EXAMPLE 1

A solution of the following composition was prepared:

BaCl$_2$, g. --------------------------------- 15.7
NiCl$_2$, g. --------------------------------- 18.2
CoCl$_2$, g. --------------------------------- 12.1
FeCl$_3$, g. --------------------------------- 272.2
CH$_3$OH, cc. -------------------------------- 450
H$_2$O, cc. ---------------------------------- 221

The solution was cooled at 0° C., 28.5 cc. of propylene oxide were added, the temperature rose and was returned to 0° C., and 199.6 cc. more of propylene oxide were added. The temperature was allowed to rise to 55° C., and the resulting material set up into a gel in 2 minutes. A powdered portion of this gel was fired at 1200° C. to convert the powder to a ferrimagnetic material.

EXAMPLE 2

A solution of the following composition was prepared:

BaCl$_2$, g. --------------------------------- 16.4
NiCl$_2$, g. --------------------------------- 14.2
CoCl$_2$, g. --------------------------------- 1.6
FeCl$_3$, g. --------------------------------- 272
CH$_3$OH, cc. -------------------------------- 469
H$_2$O, cc. ---------------------------------- 226

The solution was cooled to 0° C., 27.3 cc. of propylene oxide were added, the temperature rose and was returned to 0° C., and 191.7 cc. of propylene oxide were added. The temperature was allowed to rise to 35° C., and the resulting material set up into a gel in 5 minutes. A powdered portion of this material was fired at 1200° C. to convert the powder to a ferrimagnetic material.

EXAMPLE 3

A solution of the following composition was prepared:

BaCl$_2$, g. --------------------------------- 15.7
NiCl$_2$, g. --------------------------------- 18.2
CoCl$_2$, g. --------------------------------- 12.1
FeCl$_3$, g. --------------------------------- 272.2
CH$_3$OH, cc. -------------------------------- 450
H$_2$O, cc. ---------------------------------- 221

The solution was cooled to 0° C., 28.5 cc. of propylene oxide were added, the temperature rose and was returned to 0° C., and 199.6 cc. more of propylene oxide were added. The temperature was allowed to rise to 55° C., and the resulting material set up into a gel in 2 minutes.

EXAMPLE 5

One-quarter of the gel of Example 3 was mixed with one-quarter of the solution of Example 4 in a colloid mill for 5 minutes. 180 cc. propylene oxide were added to the mixture in the mill, and milling was continued for 30 seconds. The resulting material was removed from the mill and set up into a gel in 2 minutes.

TABLE OF MAGNETIC PROPERTIES OF MATERIALS PRODUCED IN FOREGOING HEXAGONAL IRON OXIDE EXAMPLES

| Example No. | Molecular Proportions of Starting Materials | | | | | Vol. percent Al$_2$O$_3$ | $B_R$ | $B_{4,600}$ | $B_R/B_{4,600}$ | $H_C$ | $\mu_0$ | Firing Temp., °C. | Applied Field, Oersteds |
|---|---|---|---|---|---|---|---|---|---|---|---|---|---|
| | Co$^{+2}$ | Ba$^{+2}$ | Ni$^{+2}$ | Fe$^{+3}$ | O | | | | | | | | |
| 1 | 0.8 | 1.0 | 1.2 | 15.6 | 26.4 |  |  |  |  |  |  | 1,200 | 4,600 |
| 2 | 0.2 | 1.0 | 1.8 | 15.6 | 26.4 |  | 1,350 | 5,400 | .25 | 20 |  | 1,200 | 4,600 |
| 3 | 0.8 | 1.0 | 1.2 | 15.6 | 26.4 |  |  |  |  |  |  | 1,200 | 4,600 |
| 4 |  |  |  |  |  |  |  |  |  |  |  |  |  |
| 5 | 0.8 | 1.0 | 1.2 | 15.6 | 26.4 | 15.0 |  |  |  |  |  | 1,200 | 4,600 |

C. Discussion of drawings (1) FIG. 1 is a graph showing comparisons of portions of hysteresis loops of particular ferrimagnetic materials prepared according to the process of the present invention with hysteresis loops of various prior art magnetic materials, and indicates that the magnetic properties of materials produced according to the present invention can be varied over an extremely wide range.

The portions of the hysteresis loops shown are third quadrant portions, obtained as follows. The specimens tested were in the form of discs one-quarter inch in diameter and one-eighth inch thick. Each disc in turn was placed in the magnet gap of a conventional vibrating sample magnetometer, with the diameter of the disc parallel to the applied field. The applied field was increased from zero to 4600 oersteds and then decreased to zero. The specimen was then rotated 180° about the diameter axis so that the residual field of the specimen opposed the direction of the applied field. The applied field was then increased at a gradual rate starting from zero. Because the magnetic induction of the specimen was negative as the result of rotation of the specimen, the magnetometer recorder pen rode on the bottom of the chart as though the induction were zero until the applied field was equal to the coercive force $H_C$. At this point the trace of the hysteresis loop left the zero induction line and rose rapidly, approaching saturation induction at 4600 oersteds applied field. The applied field was then decreased to zero gradually, and the trace of the hysteresis loop reached the value of $B_R$ at zero field, completing the trace of the third quadrant portion of the hysteresis loop.

Loop A is a portion of the hysteresis loop of a disc made from the ferrimagnetic material of ferrite example 16, herein, and indicates that the material has a high magnetic induction at saturation, together with a relatively high residual induction.

Loop B is a portion of a hysteresis loop of a disc made from a cobalt ferrite prepared by prior art methods and having the composition $Co_{0.15}Fe_{0.85}^{+2}Fe_2^{+3}O_4$.

Loop C is a portion of a hysteresis loop of a disc prepared from γ-iron oxide of the type generally used commercially in magnetic tapes. It will be noted that the coercive force for this material is about 230 oersteds, and the residual induction is about 390 gauss.

Loop D is a portion of a hysteresis loop of a disc prepared from the ferrimagnetic material of ferrite example 30, herein. It will be noted that this material possesses very desirable magnetic properties for magnetic tape applications, in this case a coercive force of 1084 oersteds and a residual induction of 650.6 gauss.

Loop E is a portion of a hysteresis loop of a disc made from the ferrimagnetic material of ferrite example 1, herein. It will be noted that this material also possesses very desirable magnetic properties for magnetic tape applications, in this case a coercive force of 854.4 oersteds and a residual induction of 478.5 gauss.

Loop F is a portion of a hysteresis loop of a disc made from the ferrimagnetic material of ferrite example 36, herein. It will be noted that the loop is so narrow as to have negligible area and appear as a single line, indicating that this material is valuable in applications requiring low hysteresis losses. It will also be noted that this material exhibits a very low coercive force, making the material valuable for many applications wherein this characteristic is necessary.

Loop G is a portion of a hysteresis loop of a disc made from the ferrimagnetic material of ferrite example 37, herein. It will be noted that this loop is similar to loop F in that it indicates the material to have a very low hysteresis loss and a very low coercive force.

Figure 2:
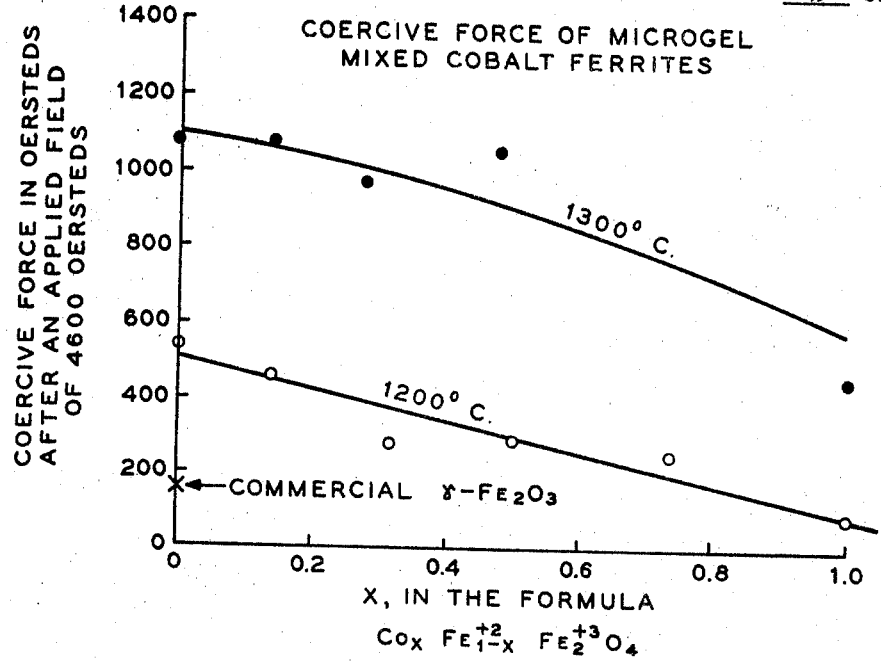
FIG. 2 is a graph showing coercive force after an applied field of 4600 oersteds as a function of composition, for various mixed cobalt ferrites prepared according to the process of the present invention, prepared with firing temperatures of 1200° C. and 1300° C., respectively.

(2) FIG. 2 is a graph showing coercive force after an applied field of 4600 oersteds as a function of the composition, for various mixed cobalt ferrites prepared according to the process of the present invention, prepared by firing at 1200° C. for 4 hours, and by firing at 1300° C. for 4 hours, respectively. The increase in coercive force is attributable to increased exchange anisotropy coupling between the ferrimagnetic portion of the material and the antiferromagnetic portion. The principal factor during preparation of ferrimagnetic materials according to the process of the present invention that influences coercive force is the firing temperature of the gel material. A subsidiary factor having less effect is the concentration of divalent cobalt, when cobalt ferrites are prepared. As the concentration of divalent cobalt increases, the concentration of α-iron oxide decreases, resulting in a decrease in coercive force.

The point X on the graph indicates the coercive force, after an applied field of 4600 oersteds, of commercial γ-Fe₂O₃, for purposes of comparing the coercive force of this material with the coercive force of the mixed cobalt ferrites prepared according to the process of the present invention.

Figure 3:
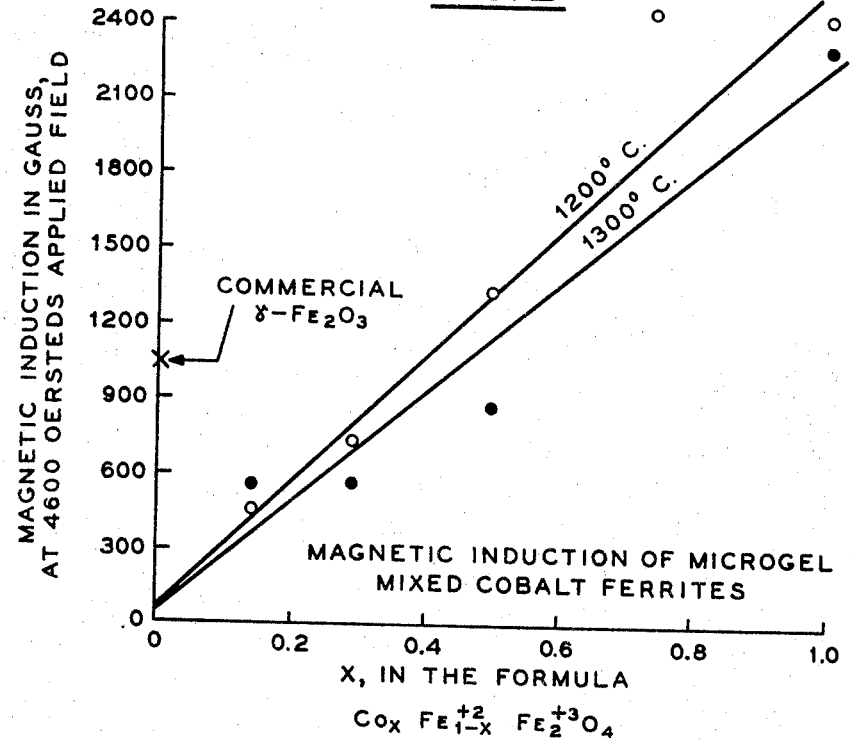
FIG. 3 is a graph of magnetic induction at a field of 4600 oersteds as a function of composition of mixed cobalt ferrites prepared according to the process of the present invention, prepared with firing temperatures of 1200° C. and 1300° C., respectively.

(3) FIG. 3 is a graph of magnetic induction at a field of 4600 oersteds as a function of composition of mixed cobalt ferrites prepared according to the process of the present invention, prepared by firing at 1200° C. for 4 hours, and by firing at 1300° C. 4 hours, respectively.

It will be noted that the magnetic induction varies little with firing temperature but increases drastically with increasing cobalt concentration. Part of the drastic increase is due to the decrease in α-iron oxide concentration with increasing cobalt concentration as described in connection with FIG. 2. The major portion of the drastic increase is due to increased saturation magnetization with an increased concentration of cobalt.

The point X on the graph indicates the magnetic induction in gauss at a field of 4600 oersteds, of commercial γ-Fe₂O₃, for purposes of comparison with the magnetic induction of mixed cobalt ferrites prepared according to the process of the present invention.

Figure 4:
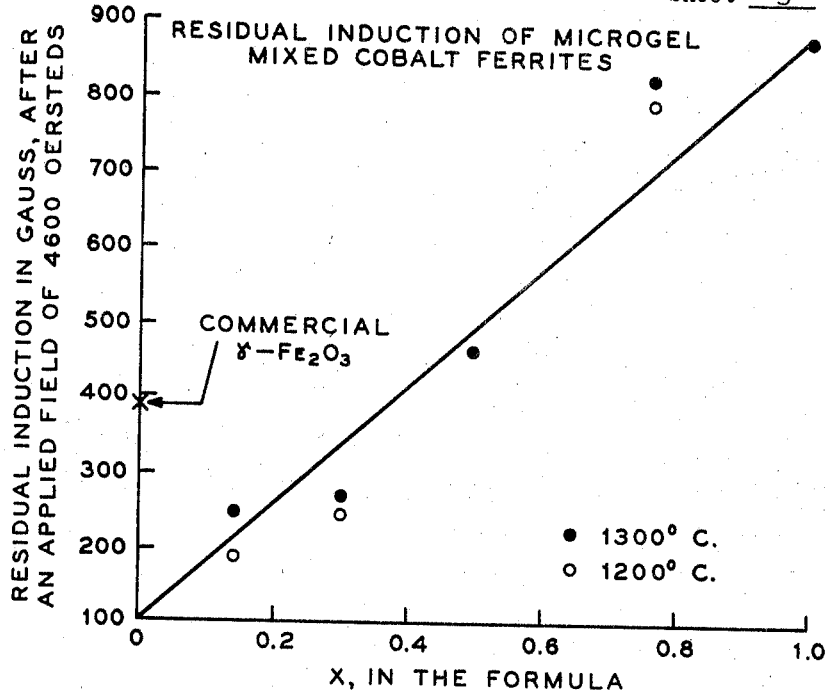
FIG. 4 is a graph of residual induction after an applied field of 4600 oersteds as a function of composition of mixed cobalt ferrites prepared according to the process of the present invention, prepared with firing temperatures of 1200° C. and 1300° C., respectively.

(4) FIG. 4 is a graph of residual induction after an applied field of 4600 oersteds as a function of composition of mixed cobalt ferrites prepared according to the process of the present invention, prepared by firing for 4 hours at 1200° C., and by firing for 4 hours at 1300° C., respectively. It will be noted that the temperature of firing has a minor effect on residual induction, just as it had a minor effect on magnetic induction in FIG. 3. The major factor affecting the residual induction is the concentration of cobalt in the ferrite.

The point X on the graph indicates the magnetic induction in gauss at a field of 4600 oersteds, of commercial γ-Fe₂O₃, for purposes of comparison with the magnetic induction of mixed cobalt ferrites prepared according to the process of the present invention.

Figure 5:
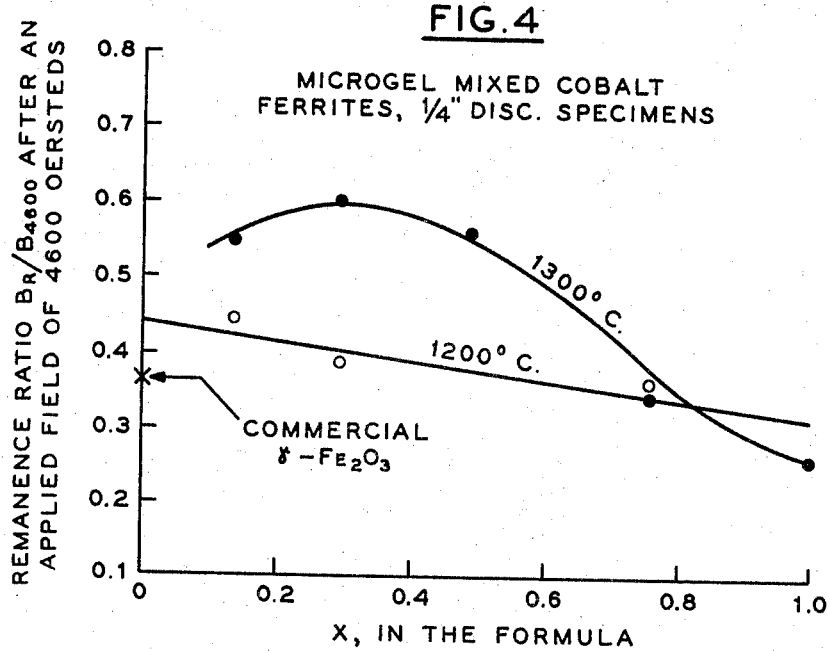
FIG. 5 is a graph of remanence ratio after an applied field of 4600 oersteds as a function of composition of mixed cobalt ferrites prepared according to the process of the present invention, prepared at firing temperatures of 1200° C. and 1300° C., respectively.

(5) FIG. 5 is a graph of remanence ratio after an applied field of 4600 oersteds as a function of composition of mixed cobalt ferrites prepared according to the process of the present invention, prepared by firing for 4 hours at 1200° C., and by firing for 4 hours at 1300° C., respectively. The remanence ratio is substantially affected by both firing temperature and ferrite composition.

The high values of remanence ratio for various ferrite compositions prepared according to the process of the present invention, as shown by the two curves, are mainly due to the dispersing effect of an α-iron oxide coating around each ferrite particle, which to a large degree prevents particle-to-particle magnetic interaction.

The point X on the graph indicates the remanence ratio after an applied field of 4600 oersteds of commercial γ-Fe₂O₃, conventionally used as the magnetic component in coatings for magnetic tapes. The indicated low remanence ratio for commercial γ-Fe₂O₃ is primarily due to the close packing of the particles of γ-Fe₂O₃. In conventional magnetic tape manufacture it is necessary to attempt to disperse the particles of γ-iron oxide in plastic; however, it is extremely difficult even by this expedient to obtain a resulting remanence ratio of 0.7.

It will be noted that the process of the present invention provides a means for tailoring the remanence ratio to a desired value, by varying temperature and ferrite composition.

Figure 6:
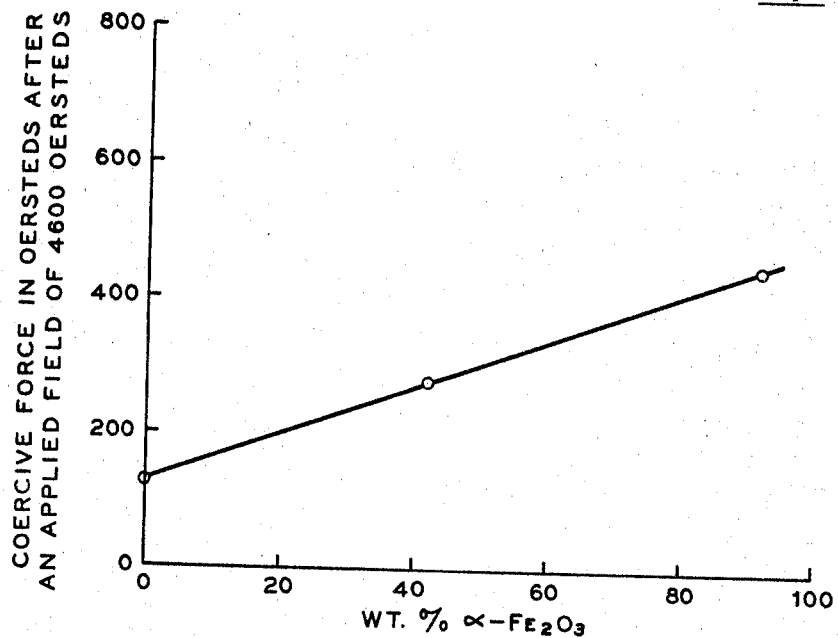
FIG. 6 is a graph showing coercive force, after an applied field of 4600 oersteds, of ferrimagnetic materials comprising mixed cobalt ferrites coupled by exchange anisotropy to α-iron oxide, prepared in accordance with the process of the present invention, as a function of weight percent of α-iron oxide present.

(6) FIG. 6 is a graph showing coercive force, after an applied field of 4600 oersteds, of ferrimagnetic materials comprising mixed cobalt ferrites coupled by exchange anisotropy to α-iron oxide, prepared according to the process of the present invention, as a function of the weight percent of α-iron oxide present. The weight percent of α-iron oxide was determined by conventional X-ray diffraction powder techniques. As the concentration of α-iron oxide increases, the thickness of the α-iron oxide surrounding the ferrite nucleus of each particle increases. Therefore, the number of electron spins coupled to the ferrite nucleus by exchange anisotropy increases; therefore the material has a higher coercive force because a larger external field is needed to change the orientation of the magnetization of the material from one easy direction to another.

Figure 7:
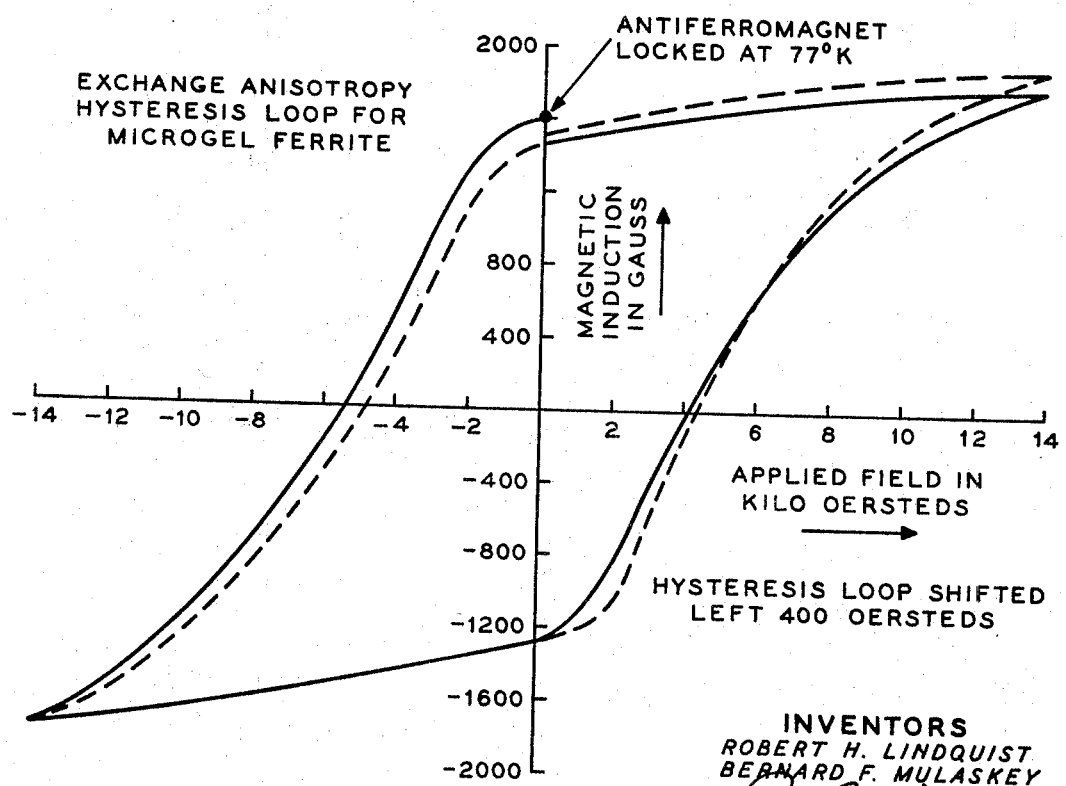
FIG. 7 is a graph of a hysteresis loop demonstrating exchange anisotropy coupling between the ferrimagnetic component and the antiferromagnetic components of a high coercive force material prepared according to the process of the present invention.

(7) FIG. 7 is a graph of a hysteresis loop demonstrating exchange anisotropy coupling between the α-iron oxide component and the cobalt ferrite nucleus component of particles produced according to the process of the present invention. The hysteresis loop shown was obtained in the following manner. A specimen made from the material of ferrite Example 32, herein, having a coercive force above 5000 oersteds at −196° C., comprising cobalt ferrite and 50 volume percent α-iron oxide, was magnetized in a field of 15,000 oersteds, to "lock in" the spins of the cobalt ferrite and the α-iron oxide. The specimen was then cooled in liquid nitrogen (−196° C.), the field was removed, and the specimen was rotated 180° in the equipment used to apply the field, so that the next application of a field would be in a direction opposite to the previous applied field. A hysteresis loop was then obtained for the specimen, and was traced through all quadrants twice, yielding the curve shown. The final cyclic loop is displaced approximately 400 oersteds to the left due to the magnetic bias resulting from "locking in" antiferromagnetic α-iron oxide preferred orientation as it was cooled below −20° C., the Morin transition temperature. This foregoing is the recognized definitive test for determining the existence of exchange anisotropy coupling, which coupling is proven to exist by the displaced hysteresis loop.

Figure 8:
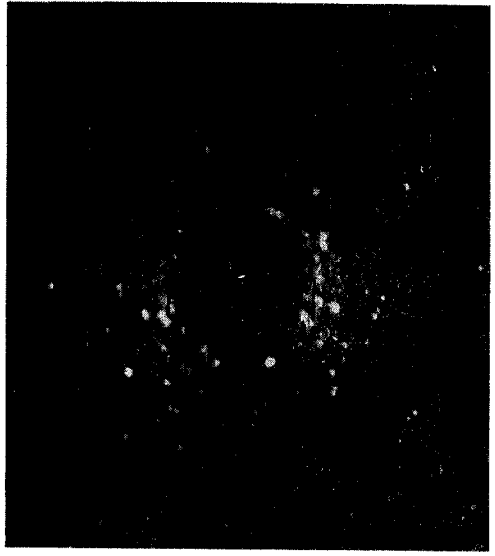
FIG. 8 is a photograph of an electron diffraction pattern showing the characteristic ring pattern of α-iron oxide.

(8) FIG. 8 is a photograph of an electron diffraction pattern of pure $\alpha$-$Fe_2O_3$, indicating the characteristic ring pattern of that material.

Figure 9:
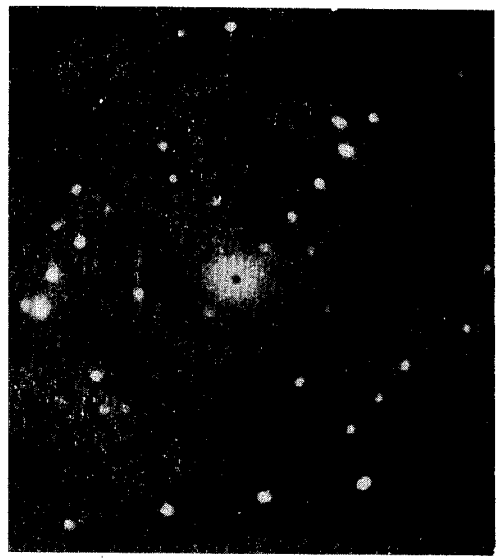
FIG. 9 is a photograph of an electron diffraction pattern showing the characteristic ring pattern of a mixed cobalt ferrite.

(9) FIG. 9 is a photograph of an electron diffraction pattern of the material of ferrite Example 35, herein, indicating the characteristic ring pattern of a mixed cobalt ferrite.

Figure 10:
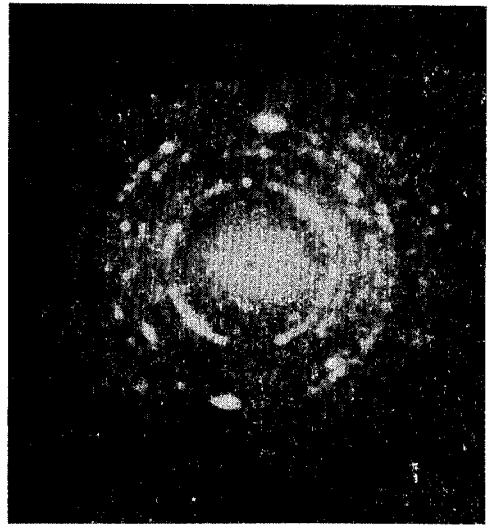
FIG. 10 is a photograph of an electron diffraction pattern of a ferrimagnetic material prepared according to the process of the present invention, comprising a ferrite coupled by exchange anisotropy to α-iron oxide, indicating that the α-iron oxide is coating the ferrite.
Figure 11:
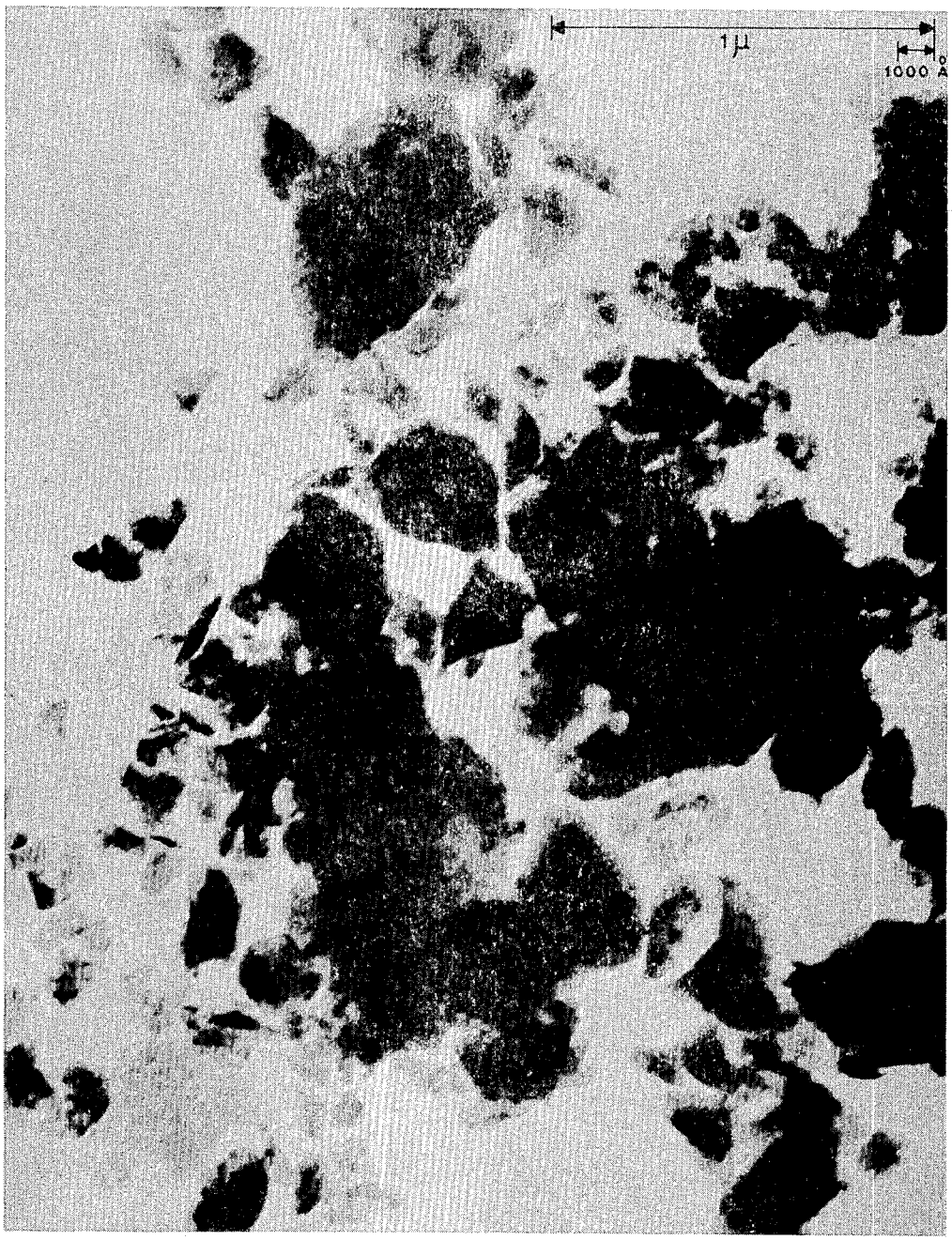
FIG. 11 is a photomicrograph illustrating a ferrimagnetic mixed cobalt ferrite powder prepared according to the process of the present invention, coupled by exchange anisotropy to α-iron oxide.

(10) FIG. 10 is a photograph of an electron diffraction pattern of a complete particle of the material shown in FIG. 11, indicating that the material consists of $\alpha$-$Fe_2O_3$ surrounding a mixed cobalt ferrite.

(11) FIG. 11 is an electron microscopy photograph, or photomicrograph, of particles of the mixed cobalt ferrite material of ferrite Example 5 herein having particle diameters ranging from 0.1 to 1.0 micron. These small particle diameters were obtained by subjecting the material to ultrasonic vibrations. The photograph indicates dark regions in each particle, surrounded by lighter-appearing regions. The dark regions are ferrite nuclei, and the lighter-appearing regions are coatings of α-iron oxide surrounding these nuclei, as indicated by the electron microscopy showing that the two regions are different crystalline phases, and as further indicated by the electron diffraction pattern shown in FIG. 9.

Figure 12:
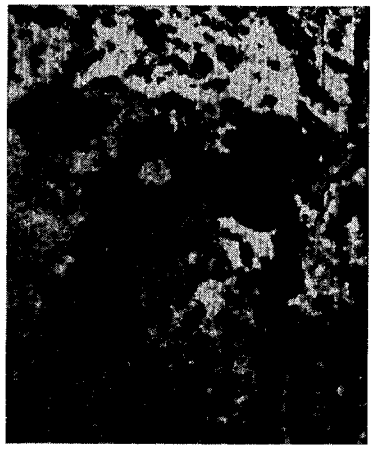
FIG. 12 is a reffection photomicrograph of an yttrium iron garnet prepared according to the process of the present invention, colloid milled with alumina for 5 minutes, and magnified approximately 500 times.

(12) FIG. 12 is a reflection photomicrograph of the polished surface, magnified 500 times, of the yttrium iron garnet material of garnet Example 5, herein, a material colloid milled with alumina for 5 minutes, and containing 30 percent alumina as indicated in garnet Example 5. The polished surface of the material necessary for reflection microscopy, and other polished materials in the following examples, was obtained by polishing with diamond dust. The largest dark areas are chunks of 50 to 100 micron-size yttrium iron garnet, and the light areas are alumina.

Figure 13:
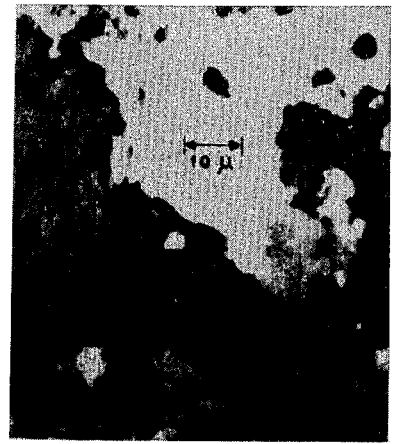
FIG. 13 is a reflection photomicrograph of an yttrium iron garnet prepared according to the process of the present invention, colloid milled with alumina for 5 minutes, and magnified approximately 1100 times.

(13) FIG. 13 is a reflection photomicrograph of the polished surface, magnified 1100 times, of the same material shown in FIG. 12, indicating the large size of the largest dark chunks of yttrium iron garnet.

Figure 14:
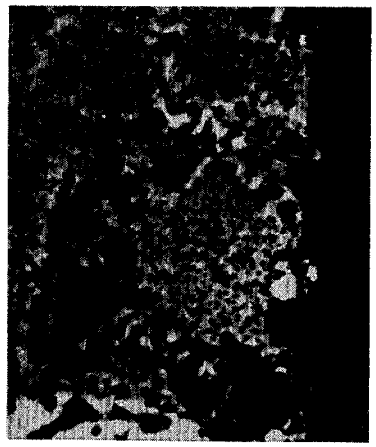
FIG. 14 is a reflection photomicrograph of an yttrium iron garnet prepared according to the process of the present invention, colloid milled with alumina for 30 minutes, and magnified approximately 500 times.
Figure 15:
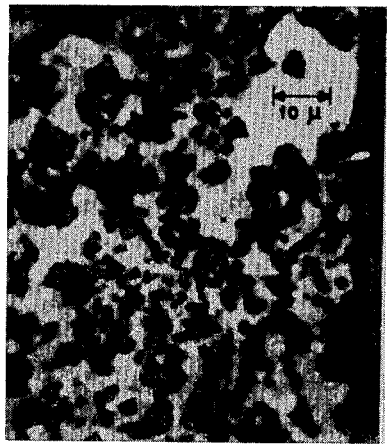
FIG. 15 is a reflection photomicrograph of an yttrium-iron garnet prepared according to the process of the present invention, colloid milled with alumina for 30 minutes, and magnified approximately 1100 times.

(14) FIG. 14 is a reflection photomicrograph of the polished surface, magnified 500 times, of the yttrium iron garnet material of garnet Example 6, herein, an alumina-containing material that had been colloid milled for 30 minutes, rather than 5 minutes, as in the case of the material shown in FIGS. 13 and 14. FIG. 15 shows a profusion of yttrium iron garnet particles having a diameter below 5 microns, indicating that prolonged colloid milling is advantageous in dispersing the garnet particles in the alumina, and in producing garnet particles of reduced size.

(15) FIG. 15 is a reflection photomicrograph of the polished surface, magnified 1100 times, of the same material shown in FIG. 14. This photomicrograph indicates the extent of the uniform dispersion in the alumina matrix of the particles of yttrium iron garnet, and indicates that these particles range from 2 to 5 microns in diameter.

Figure 16:
FIG. 16 is a reflection color photomicrograph of the polished surface of an yttrium iron garnet prepared according to the process of the present invention, colloid milled with alumina for 5 minutes, and magnified approximately 5000 times.

(16) FIG. 16 is a reflection color photomicrograph of the polished surface, magnified approximately 5000 times, of the yttrium iron garnet material of garnet Example 5, herein. This is the same material shown in FIGS. 12 and 13; however, the present figure is a photomicrograph of only an area of the material that is indicated in FIGS. 12 and 13 to contain the smaller yttrium iron garnet particles. The photomicrograph in the present figure was made using conventional cross-polarized lighting techniques, to produce a clear color distinction between the yttrium iron garnet crystallites, which are the grey-green areas, the surrounding alumina particles, which are the yellow, yellow-orange and orange areas, and the micropores, which are the white areas.

Figure 17:
FIG. 17 is a reflection photomicrograph of the polished surface of an yttrium iron garnet prepared according to the process of the present invention, magnified approximately 1130 times.

(17) FIG. 17 is a reflection photomicrograph of the polished surface, magnified 1130 times, of the yttrium iron garnet material of garnet Example 3, herein, illustrating the small crystallite structure after heat treatment at 1300° C. The crystallites are less than one micron in diameter and appear quite uniform in size. The dark area running through the sample is a cross-section of a large pore.

Figure 18:
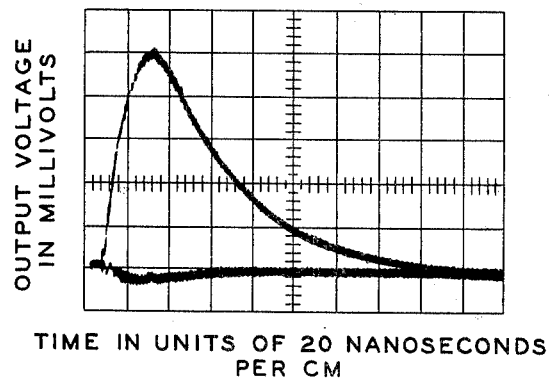
FIG. 18 is a graph of an oscilloscope trace of switching time for a ferromagnetic switching device comprising a ferrimagnetic garnet prepared by the process of the present invention.

(18) FIG. 18 is a graph of an oscilloscope trace of switching time for a ferrimagnetic switching device comprising a wafer specimen made from the ferrimagnetic garnet material of garnet Example 3, herein. The specimen was one-quarter inch in diameter and 30 mils thick, and was examined for switching time in a conventional switching speed tester which was connected to a high speed sampling oscilloscope so that the results could be observed visually. The switching time with a 20 oersted drive field was 100 nanoseconds, i.e., $100 \times 10^{-9}$ seconds.

Figure 19:
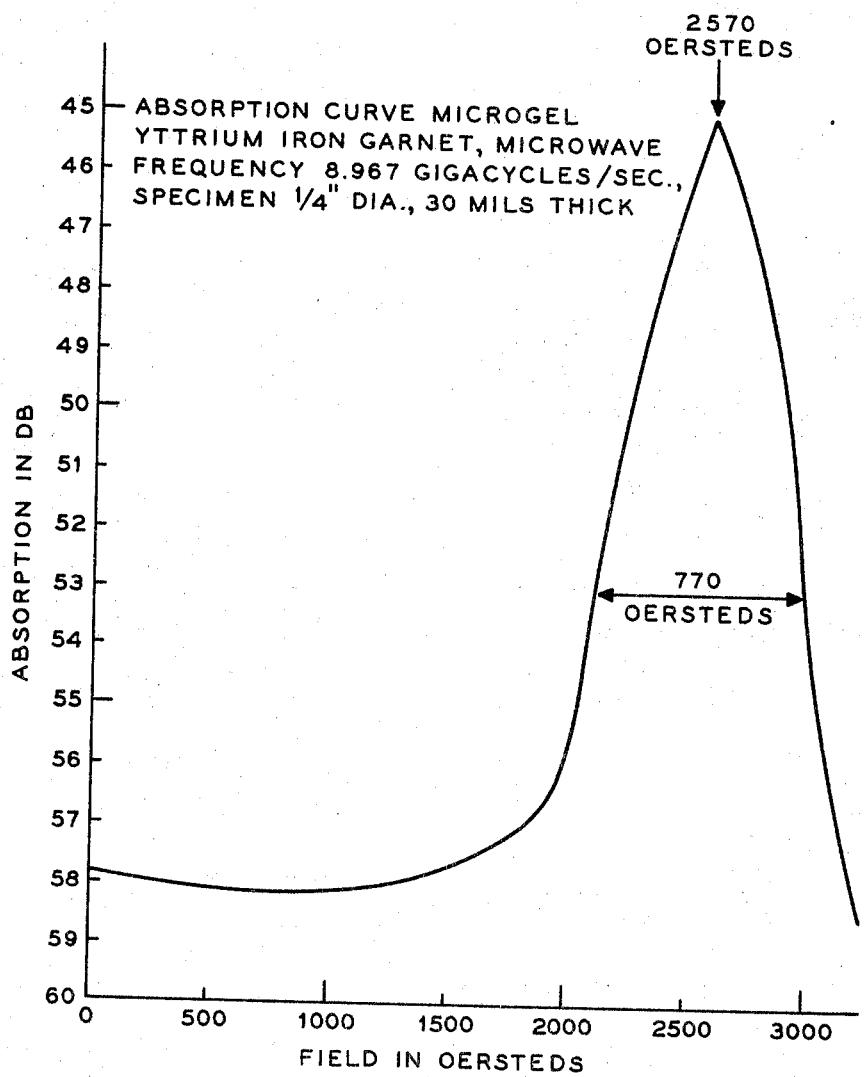
FIG. 19 is a graph of the microwave absorption curve of an yttrium iron garnet prepared according to the process of the present invention.

(19) FIG. 19 is a graph of a microwave absorption curve at 8.97 gigacycles (gc.) per second (1 gc.=1000 mc.) for a specimen made with the yttrium iron garnet material of garnet Example 3, herein, the same material shown in FIG. 17. The specimen was a wafer one-quarter inch in diameter and 30 mils thick. The absorption curve was obtained by placing this specimen at the center of a cross-guide coupler in an X-band microwave system. A maximum in magnetic field was located for a transverse electric magnetic (TEM) mode standing microwave field. One of the legs of the cross-guide coupler was terminated in a crystal detector orthogonal to the propagation leg. In this configuration ferromagnetic resonance is observed as a decrease in isolation of the detection leg of the propagation leg. Thus, as shown in the figure, with a change in magnetic field there is a change in isolation from −58 to −45 db's as measured by a powermeter connected to the output of the crystal. With the process of the present invention the line width and peak height, functions of the composition of the ferrimagnetic material, can be varied over wide parameters because the composition can be widely varied.

We claim:

1. The process of manufacturing a material, a mass of finely divided particles of which an applied magnetic field can induce to change from a nonmagnetized condition, in the sense of exhibiting no net external field, to a magnetized condition, in the sense of exhibiting an external field, which comprises reacting starting materials comprising a salt of a first metal in the divalent state, a salt of iron in the trivalent state, and an epoxy compound to obtain a mixture comprising a metal hydroxide-containing gel, and heating said mixture to produce the desired composition.

2. The process as in claim 1, wherein said heating is accomplished at a temperature of at least 600° C.

3. The process as in claim 2, wherein said heating is accomplished at a temperature in the range of 1100° to 1600° C.

4. The process as in claim 1, wherein said epoxy compound is an oxide selected from the group consisting of ethylene oxide, propylene oxide and butylene oxide.

5. The process as in claim 4, wherein said epoxy compound is propylene oxide.

6. The process of manufacturing a ferrimagnetic material, which comprises contacting a halide of a first metal in the divalent state, a halide of iron in the trivalent state, each of said halides comprising a halogen having an atomic number greater than 9, an alkylene oxide, and a solvent for said halides and said alkylene oxide, said solvent comprising a lower alkanol and water, to produce a mixture comprising a metal hydroxide gel, and heating said gel to impart ferrimagnetic properties thereto.

7. The process as in claim 6, wherein said solvent is methanol.

8. The process as in claim 6, wherein said alkylene oxide is propylene oxide.

9. The process as in claim 6, wherein said alkylene oxide is ethylene oxide.

10. The process of manufacturing a composition having magnetic properties which comprises reacting cobaltous chloride, ferrous chloride, ferric chloride, water, a lower alkanol and propylene oxide to form a mixture comprising a gel of cobalt and iron hydroxides, drying said gel, and heating the resulting dried gel at a temperature above 600° C. to convert said dried gel to cobalt ferrite.

11. The process of claim 10, with the additional step of subdividing said cobalt ferrite into finely divided particles suitable for use in electromagnetic applications including magnetic tape manufacture.

12. The process of manufacturing a magnetic composition having ferrimagnetic properties and containing metal ions in more than one oxidation state which comprises contacting a halide of a metal in one oxidation state, a halide of a metal in a different oxidation state, each of said halides comprising a halogen having an atomic number greater than 9, a lower alkylene oxide, and an oxygen-containing compound selected from the group consisting of a lower alkanol and water, to form a mixture comprising a metal hydroxide gel, drying said gel, and imparting ferrimagnetic properties to the resulting dried gel by heating to a temperature above 600° C. at least until said material becomes ferrimagnetic.

13. The process as in claim 10, wherein said heating is at a temperature between 1100° and 1600° C.

14. The process as in claim 12, wherein said oxygen-containing compound is water.

15. The process as in claim 12, wherein said oxygen-containing compound is a lower alkanol and water.

16. The process of manufacturing cobalt ferrites which comprises heating a uniform gel in the form $$CoFe_2(OH)_8$$

to a temperature above 600° C. to produce $CoFe_2O_4$ by cation diffusion.

17. The process as in claim 16, wherein said heating is conducted at a temperature from 1100° C. to 1600° C.

18. The process of manufacturing a mixed ferrite which comprises heating a uniform gel in the form $$M_{A_X}^{2+}M_{B_{1-X}}^{2+}Fe_2^{3+}(OH)_8$$

where $M_A$ is a divalent metal and $M_B$ is a different divalent metal, and where X is greater than zero but less than 1, to a temperature above 600° C. to produce ferrimagnetic $M_{A_X}^{2+}M_{B_{1-X}}^{2+}Fe_2^{3+}O_4$ by cation diffusion.

19. The process as in claim 18, wherein said heating is conducted above 800° C.

20. The process as in claim 18, wherein $M_A$ is magnesium, and $M_B$ is manganese.

21. The process as in claim 18, wherein $M_A$ is cobalt and $M_B$ is iron.

22. The process of manufacturing a substitution ferrite which comprises heating a uniform gel in the form $M_A^{2+}M_{B_X}^{3+}Fe_{2-X}^{3+}(OH)_8$, where $M_A$ is a divalent metal and $M_B$ is a trivalent metal other than iron, and where X is greater than zero but less than 2, to a temperature above 600° C., to produce ferrimagnetic $$M_A^{2+}M_{B_X}^{3+}Fe_{2-X}^{3+}O_4$$

by cation diffusion.

23. The process as in claim 22, wherein $M_B$ is aluminum.

24. The process of manufacturing a mixed substitution ferrite which comprises heating a uniform gel of $$M_{A_X}^{2+}M_{B_{1-X}}^{2+}M_{C_Y}^{3+}M_{D_{2-Y}}^{3+}(OH)_8$$

where $M_A$ and $M_B$ are different divalent metals, $M_C$ is trivalent iron, $M_D$ is a trivalent metal other than iron, X is greater than zero but less than 1, and Y is greater than zero but less than 2, to a temperature above 600° C. to produce ferrimagnetic $M_{A_X}^{2+}M_{B_{1-X}}^{2+}M_{C_Y}^{3+}M_{D_{2-Y}}^{3+}O_4$ by cation diffusion.

25. The process as in claim 24, wherein $M_A$ is magnesium, $M_B$ is manganese, and $M_D$ is aluminum.

26. The process as in claim 25, wherein a stoichiometric excess of aluminum is present in the final ferrimagnetic product.

27. The process of producing a ferrimagnetic material which comprises dissolving a halide of a metal in the divalent state and a halide of iron in the trivalent state in an aqueous polar organic solvent having a pH of about from 6 to 8 containing sufficient water to convert each halide to the corresponding hydroxide, adding approximately one mol of an epoxy compound per equivalent of halide to produce a hydrogel, drying said hydrogel, and heating said dried hydrogel at a temperature above about 600° C. for a time sufficient to convert said dried hydrogel to the desired ferrimagnetic material.

28. The process as in claim 27, wherein said heating is accomplished at a temperature in the range of 1100° to 1600° C.

29. The process as in claim 27, wherein said epoxy compound is an alkylene oxide selected from the group consisting of ethylene oxide, propylene oxide and butylene oxide.

30. The process as in claim 27, wherein each of said halides comprises a halogen having an atomic number greater than 9.

31. The process as in claim 29, wherein said alkylene oxide is propylene oxide.

32. The process of producing a ferrimagnetic ferrospinel which comprises dissolving halides of the metal precursors of said ferrospinel including a halide of iron in the trivalent state, in water, mixing approximately one mol of an epoxy compound per equivalent of halide with the resulting solution to produce a hydrogel, and heating said hydrogel to a temperature above about 600° C. for a time sufficient to convert said hydrogel to the desired ferrimagnetic ferrospinel.

33. The process as in claim 32, wherein said heating is accomplished at a temperature in the range of 1100° to 1600° C.

34. The process as in claim 32, wherein said epoxy compound is an alkylene oxide selected from the group consisting of ethylene oxide, propylene oxide and butylene oxide.

35. In the production of a ferrimagnetic material comprising a mixture of at least one divalent metal oxide and at least one trivalent iron oxide, the improvement which comprises hydrolyzing, in the presence of an epoxy compound, a metal salt precursor of said divalent metal oxide, a metal salt precursor of trivalent iron oxide, to convert said metal salts predominantly to metal hydroxides, and heating said hydroxides to a temperature above 600° C. for a time sufficient to convert said hydroxides to said ferrimagnetic mixture of said oxides.

36. A process for producing a ferrite, which comprises dissolving halides of the metal cation precursors of the ferrite, including a halide of iron in the trivalent state, in a hydroxylic solvent having a pH in the range of about 5 to 7, reacting the resulting solution with an epoxy compound to produce a gel, and heating said gel at a temperature above about 600° C. for a time sufficient to convert said gel to the desired ferrite.

37. A process as in claim 36, wherein said heating is accomplished at a temperature in the range of 1100° to 1600° C.

38. A process as in claim 36, wherein said epoxy compound is an alkylene oxide selected from the group consisting of ethylene oxide, propylene oxide and butylene oxide.

39. A process as in claim 38, wherein said alkylene oxide is propylene oxide.

44. A process for producing a magnetic material, which comprises converting a halide of a first metal in the divalent state and a halide of iron in the trivalent state, to a gel mixture of the corresponding hydroxides in the presence of an alkylene oxide, and converting said gel mixture to the desired magnetic material by heating at a temperature in the range 1100° to 1600° C.

41. A process as in claim 40, wherein said alkylene oxide is an oxide selected from the group consisting of ethylene oxide, propylene oxide and butylene oxide.

42. A process as in claim 41, wherein said alkylene oxide is propylene oxide.

43. A process for preparing a ferrimagnetic material which comprises concurrently converting a halide of a first metal in the divalent state and a halide of a second metal in the trivalent state, each of said halides comprising a halogen having an atomic number greater than 9, to a uniform gel mixture of the corresponding metal hydroxides, heating said gel to convert said mixture of metal hydroxides to a mixture of the corresponding oxides, powdering said mixture of oxides, and converting said mixture of oxides to a ferrimagnetic material by heating at a temperature from 1100° to 1600° C.

44. A process for manufacturing an yttrium iron garnet, which comprises dissolving a halide of yttrium and a ferric halide, each of said halides comprising a halogen having an atomic number greater than 9, in a lower alkanol and water, adding a lower alkylene oxide to the resulting solution, allowing the resulting material to set up into a gel mixture of metal hydroxides, heating said gel to convert said mixture of hydroxides to a mixture of the corresponding metal oxides, powdering said mixture of oxides, and converting said mixture of oxides to an yttrium iron garnet structure by heating.

45. A process as in claim 44, wherein a ferrous halide also is dissolved in said lower alkanol and water.

References Cited

UNITED STATES PATENTS

| | | | |
|---|---|---|---|
| 2,739,044 | 3/1956 | Kearby | 252—466 |
| 3,039,963 | 6/1962 | MacCallum | 252—62.5 |
| 3,047,429 | 7/1962 | Stoller et al. | 252—62.5 |
| 2,306,198 | 12/1942 | Verweij et al. | 117—100 |
| 3,029,160 | 4/1962 | Van Der Beck | 117—100 |
| 3,055,833 | 9/1962 | Baltzer | 252—62.5 |
| 3,100,194 | 8/1963 | Van Der Burgt et al. | 252—62.5 |

FOREIGN PATENTS

| | | |
|---|---|---|
| 899,680 | 6/1962 | Great Britain. |

OTHER REFERENCES

Harvey: Ferromagnetic Spinels, RCA Review, September 1950, volume XI, No. 3, p. 346.

TOBIAS E. LEVOW, *Primary Examiner.*

ROBERT D. EDMONDS, *Assistant Examiner.*

U.S. Cl. X.R.

252—62.57, 62.62, 62.64, 62.59, 62.6, 62.63

PO-1050
(5/69)

UNITED STATES PATENT OFFICE
CERTIFICATE OF CORRECTION

Patent No. 3,425,666      Dated February 4, 1969

Inventor(s) ROBERT H. LINDQUIST and BERNARD F. MULASKEY

It is certified that error appears in the above-identified patent and that said Letters Patent are hereby corrected as shown below:

Col. 1 at line 54, the formula should read $$--M_{A_X}^{2+} M_{B_{1-X}}^{2+} M_{C_Y}^{3+} M_{D_{2-Y}}^{3+} O_4--$$

Col. 1 at line 55, the formula should read:

$$--Ni_X^{2+} Co_{1-X}^{2+} Al_Y^{3+} Fe_{2-Y}^{3+} O_4--$$

Col. 5, line 44, "ferromagnetic" should read --ferrimagnetic--.

Col. 14, line 60, the formula should read $$--Mg_{0.5} Mn_{1.5} Fe_{1.0} (OH)_8--$$

Col. 15, line 42, the formula should read $$--Mg_{0.5} Mn_{1.5} Fe_{1.0} Al_{1.0} (OH)_{11}--$$

Col. 17, in the table for garnet examples, under "Molecular Proportions of Starting Materials", the headings should read $$--Y^{+3} \quad Gd^{+3} \quad Fe^{+2} \quad Fe^{+3} \quad O--$$

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents